United States Patent
Nagasaki et al.

(10) Patent No.: US 10,362,197 B2
(45) Date of Patent: Jul. 23, 2019

(54) IMAGE CONTROL DEVICE AND NON-TRANSITORY COMPUTER READABLE MEDIUM

(71) Applicant: FUJI XEROX CO., LTD., Tokyo (JP)

(72) Inventors: Takaya Nagasaki, Kanagawa (JP); Seiji Shiraki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/652,255

(22) Filed: Jul. 18, 2017

(65) Prior Publication Data

US 2018/0139357 A1 May 17, 2018

(30) Foreign Application Priority Data

Nov. 16, 2016 (JP) ................. 2016-223408

(51) Int. Cl.
*H04N 1/60* (2006.01)
*H04N 1/00* (2006.01)

(52) U.S. Cl.
CPC ....... *H04N 1/6005* (2013.01); *H04N 1/00023* (2013.01); *H04N 1/00034* (2013.01); *H04N 1/00045* (2013.01); *H04N 1/00074* (2013.01); *H04N 1/00082* (2013.01); *H04N 1/6027* (2013.01); *H04N 1/6066* (2013.01); *H04N 2201/0005* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 2010/0271673 A1* | 10/2010 | Ohkawa ............... | H04N 1/6033 358/518 |
| 2017/0359487 A1* | 12/2017 | Andersen ............. | H04N 1/6005 |
| 2018/0198958 A1* | 7/2018 | Yoshida ............... | H04N 1/6038 |

FOREIGN PATENT DOCUMENTS

JP    2006-086828    3/2006

* cited by examiner

*Primary Examiner* — Barbara D Reinier
(74) *Attorney, Agent, or Firm* — JCIPRNET

(57) ABSTRACT

An image control device includes a reception unit that receives patch chart data items arranged such that the patch data items corresponding to a plurality of patches belonging to a same hue, among a plurality of patches constituting a patch chart, are positioned only in any of grid points of grid lines which divide a lightness axis and a saturation axis which define a hue plane corresponding to the hue at equal intervals, and a controller that outputs the patch chart data items to an image forming unit which forms the patch chart on a recording material if an output operation of the patch chart is received.

9 Claims, 19 Drawing Sheets

FIG. 9
HSL COLOR SPACE
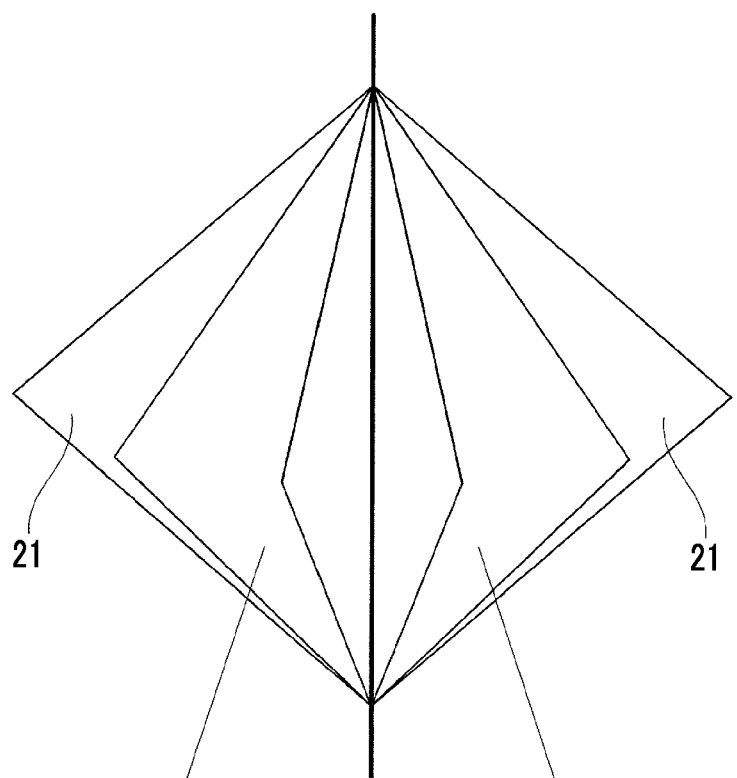
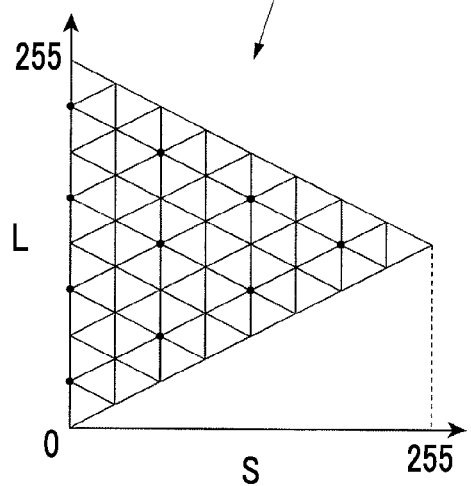 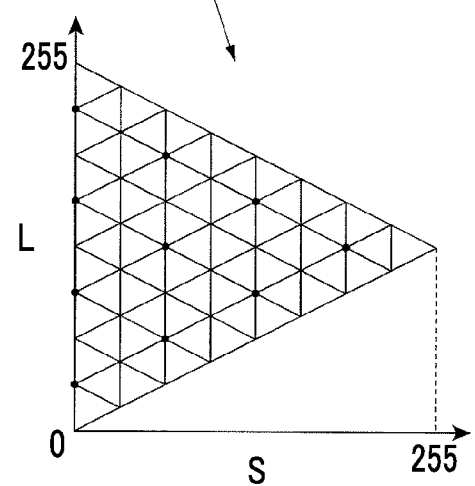
●——5 ⋯ EQUIVALENT PATCH DATA

| | HSL VALUES OF PATCH DATA ITEMS OF TWELVE COLOR COMPONENTS | | | RGB VALUES CORRESPONDING TO HSL VALUES | | | COLORIMETRIC RESULTS IN IMAGE READING UNIT | | |
|---|---|---|---|---|---|---|---|---|---|
| | H | S | L | B | G | R | L | a | b |
| | 0 | 32 | 16 | 0 | 0 | 32 | 18.25 | 14.71 | 5.92 |
| | 0 | 64 | 32 | 0 | 0 | 64 | 23.8 | 26.23 | 14.76 |
| | 0 | 96 | 48 | 0 | 0 | 96 | 27.1 | 34.95 | 20.3 |
| | 0 | 128 | 64 | 0 | 0 | 128 | 30.67 | 40.45 | 24.57 |
| | 0 | 160 | 80 | 0 | 0 | 160 | 34.15 | 47.17 | 28.81 |
| | 0 | 192 | 96 | 0 | 0 | 192 | 38.46 | 55.61 | 34.89 |
| | 0 | 224 | 112 | 0 | 0 | 224 | 41.18 | 60.06 | 38.67 |
| 441 DATA ITEMS | 0 | 256 | 128 | 0 | 0 | 256 | 43.17 | 65.46 | 42.62 |
| | 0 | 32 | 48 | 32 | 32 | 64 | 28.04 | 15.43 | 6.94 |
| | 0 | 64 | 64 | 32 | 32 | 96 | 29.92 | 28.21 | 12.13 |
| | 0 | 96 | 80 | 32 | 32 | 128 | 33.04 | 36.44 | 16.64 |
| | 0 | 128 | 96 | 32 | 32 | 160 | 35.39 | 45.44 | 22.56 |
| | 0 | 160 | 112 | 32 | 32 | 192 | 39.54 | 55.34 | 29.31 |
| | 0 | 192 | 128 | 32 | 32 | 224 | 42.36 | 60.54 | 33.09 |
| | 0 | 224 | 144 | 32 | 32 | 256 | 46.31 | 63.35 | 35.25 |
| | 0 | 32 | 80 | 64 | 64 | 96 | 38.47 | 13.98 | 6.37 |

441 PATCH COLORIMETRIC VALUES (a-b SURFACE)

| | HSL VALUES CORRESPONDING TO RGB VALUES | | | RGB VALUES CORRESPONDING TO POINTS OF MULTIDIMENSIONAL INPUT CORRESPONDENCE TABLE | | | COLOR VALUES AFTER COMPLEMENTARY OPERATION | | |
|---|---|---|---|---|---|---|---|---|---|
| | H | S | L | B | G | R | L | a | b |
| | | 0 | 0 | 0 | | 0 | 19.55 | -0.75 | -4.29 |
| | 0 | 16 | 8 | 0 | 0 | 16 | 20.77 | 6.21 | -0.09 |
| | 0 | 32 | 16 | 0 | 0 | 32 | 22.5 | 12.32 | 4.63 |
| | 0 | 48 | 24 | 0 | 0 | 48 | 24.5 | 17.95 | 9.39 |
| | 0 | 64 | 32 | 0 | 0 | 64 | 26.69 | 23.13 | 14.12 |
| | 0 | 80 | 40 | 0 | 0 | 80 | 29.03 | 27.89 | 18.76 |
| | 0 | 96 | 48 | 0 | 0 | 96 | 31.44 | 32.26 | 23.26 |
| | 0 | 112 | 56 | 0 | 0 | 112 | 33.87 | 36.29 | 27.55 |
| | 0 | 128 | 64 | 0 | 0 | 128 | 36.24 | 40 | 31.58 |
| 4913 DATA ITEMS | 0 | 144 | 72 | 0 | 0 | 144 | 38.5 | 43.42 | 35.27 |
| | 0 | 160 | 80 | 0 | 0 | 160 | 40.59 | 46.6 | 38.58 |
| | 0 | 176 | 88 | 0 | 0 | 176 | 42.43 | 49.55 | 41.45 |
| | 0 | 192 | 96 | 0 | 0 | 192 | 43.96 | 52.33 | 43.8 |
| | 0 | 208 | 104 | 0 | 0 | 208 | 45.13 | 54.95 | 45.59 |
| | 0 | 224 | 112 | 0 | 0 | 224 | 45.86 | 57.46 | 46.75 |
| | 0 | 240 | 120 | 0 | 0 | 240 | 46.1 | 59.89 | 47.22 |
| | 0 | 256 | 128 | 0 | 0 | 256 | 45.81 | 62.12 | 46.98 |
| | 120 | 16 | 8 | 0 | 16 | 0 | 23.12 | -8.91 | 3.07 |
| | 60 | 16 | 8 | 0 | 16 | 16 | 25.93 | -1.61 | 6.3 |
| | 30 | 32 | 16 | 0 | 16 | 32 | 27.58 | 5.29 | 10.96 |
| | 20 | 48 | 24 | 0 | 16 | 48 | 29.14 | 11.26 | 15.02 |

210

4913 DATA COMPLEMENTARY RESULTS (a-b SURFACE)

IMAGE CONTROL DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-223408 filed Nov. 16, 2016.

BACKGROUND (i) Technical Field

Exemplary embodiments of the present invention relate to an image control device, a patch chart, and a non-transitory computer readable medium.

(ii) Related Art

In order to ascertain an input and output characteristic model of an image forming device, it is known that a patch chart constituted by multiple patches is used.

SUMMARY

The input and output characteristic model is defined by the relationship between input color signals (for example, RGB values) and output colors (for example, Lab values). The RGB values selected at equal intervals in an RGB color space which is a color space of the input color signals are currently used as patch data items corresponding to the patches. Incidentally, the patch data items arranged at equal intervals in the RGB color space are irregularly arranged in a CIELab color space to which colorimetric values belong.

Thus, particularly in a case where the number of patch data items is small, the accuracy of a complementary operation based on the colorimetric values is deteriorated, and thus, the accuracy of the input and output characteristic model created by the complementary operation is also deteriorated. This technical problem is improved to some extent by increasing the number of patch data items. However, due to the increase in the number of patch data items, more effort in performing colorimetry is required, and it takes a long time to generate the input and output characteristic model.

According to an aspect of the present invention, there is provided an image control device including: a reception unit that receives patch chart data items arranged such that the patch data items corresponding to multiple patches belonging to a same hue, among multiple patches constituting a patch chart, are positioned only in any of grid points of grid lines which divide a lightness axis and a saturation axis which define a hue plane corresponding to the hue at equal intervals; and a controller that outputs the patch chart data items to an image forming unit which forms the patch chart on a recording material if an output operation of the patch chart is received.

BRIEF DESCRIPTION OF THE DRAWINGS

Exemplary embodiment(s) of the present invention will be described in detail based on the following figures, wherein:

FIG. 9 is a diagram showing an example in which two hue planes of twelve hue planes adopt the same arrangement of the equivalent patch data items;

DETAILED DESCRIPTION

Hereinafter, an exemplary embodiment of the present invention will be described in detail with reference to the accompanying drawings.

Patch Chart

Figure 1:
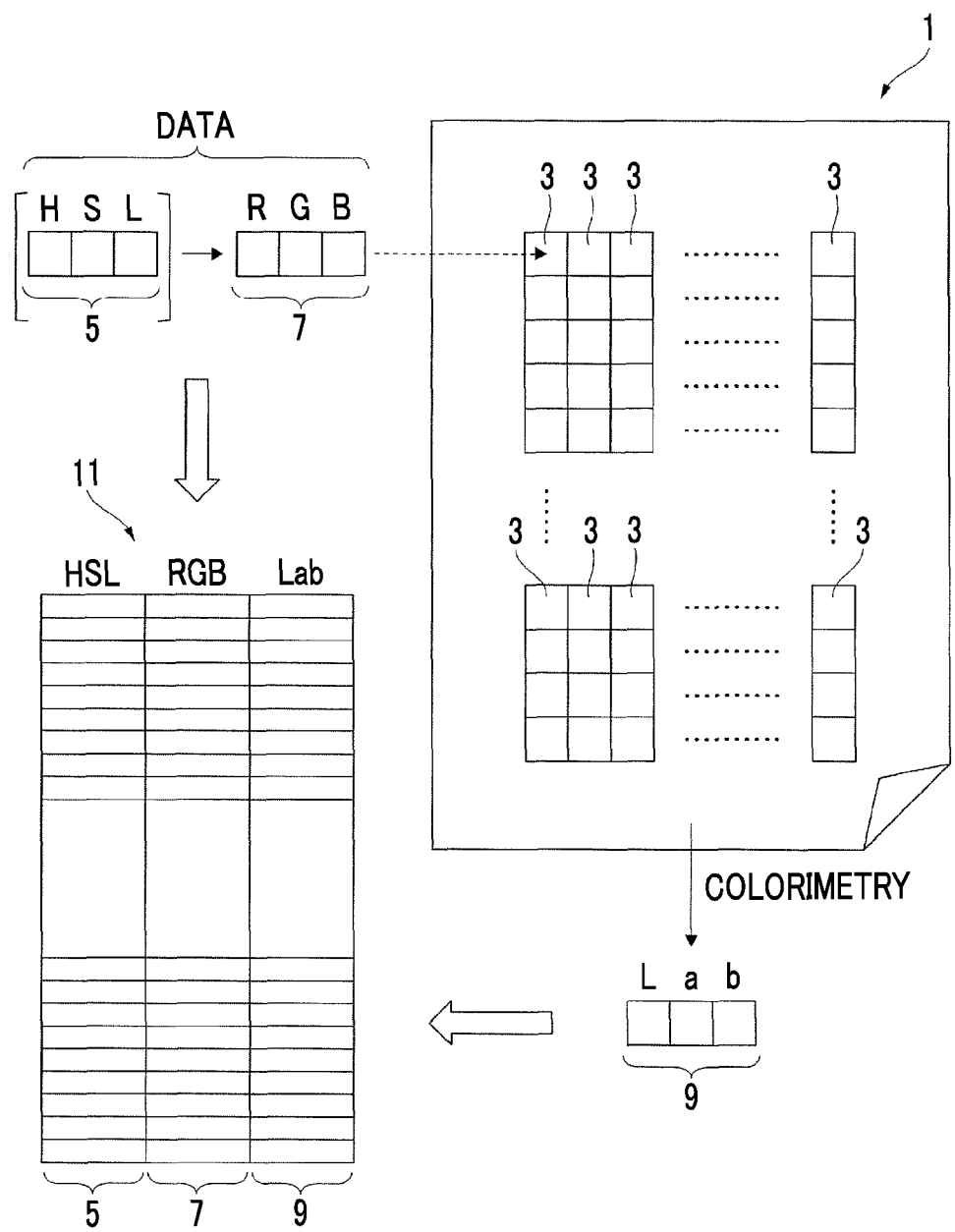
FIG. 1 is a diagram for describing the relationship between a configuration example of a patch chart used in the present exemplary embodiment and patch data items.

FIG. 1 is a diagram for describing the relationship between a configuration example of a patch chart 1 used in the present exemplary embodiment and patch data items 7. The patch chart 1 is an array of colors output for recognizing input and output characteristics of an image forming device (for example, a printing device or a display device), and includes multiple patches 3 corresponding to the colors. The patch 3 is an image which is a color sample constituted by a specific color previously selected for colorimetry.

The patch data items 7 are image data items constituted by specific colors corresponding to individual patches 3. The patch data items 7 are provided as data items in an RGB color space which is an orthogonal coordinate system to the image forming device.

Equivalent patch data items 5 are color data items in a color space defined by hue (H), saturation (S), and lightness (L), and are used for determining the patch data items 7 and creating an input and output characteristic model 11 in the present exemplary embodiment. In the exemplary embodiment of the present invention, it is assumed that an index indicating brightness is called lightness (L). Accordingly, the lightness (L) in the exemplary embodiment of the present invention includes value. Accordingly, the color space defined by the hue (H), the saturation (S), and the lightness (L) includes a so-called HSL color space or a so-called HSV color space.

The HSL color space defined by the hue (H), the saturation (S), and the lightness (L) is a device-dependent color space similarly to the RGB color space. Accordingly, the color space defined by the hue (H), the saturation (S), and the lightness (L) is in a one-to-one correspondence with the RGB color space. Thus, it is easy to calculate a color value in the other color space from a color value in one color space.

Colorimetric values 9 which are colorimetric results of the patches 3 are color data items in a device-independent CIELab color space (hereinafter, referred to as a Lab color space) expressed by the lightness (L) and two complementary color dimensions (a and b). As stated above, the Lab color space and the color space expressed by the lightness (L), the hue (H), and the saturation (S) have a similar structure. Thus, actual measurement values (colorimetric values 9) of color data items regularly arranged in the color space defined by the hue (H), the saturation (S), and the lightness (L) are likely to be regularly arranged in the Lab color space.

In the present exemplary embodiment, the arrangement of the equivalent patch data items 5 is determined such that the equivalent patch data items have regularity in the color space defined by the hue (H), the saturation (S), or the lightness (L), and the patch data items 7 corresponding to the equivalent patch data items 5 are provided to the image forming device. That is, in the present exemplary embodiment, the arrangement of the equivalent patch data items 5 is determined for determining the patch data items 7. A specific arrangement example of the equivalent patch data items 5 will be described below.

In FIG. 1, the input and output characteristic model 11 is also shown. The input and output characteristic model 11 is generated by creating a correspondence table of the patch data items 7 which are input values, the corresponding equivalent patch data items 5, and the colorimetric values 9 in the Lab color space and then performing a complementary operation based on an approximate expression (relational expression) calculated between the equivalent patch data items 5 and the colorimetric values 9. Here, since both the equivalent patch data items 5 and the corresponding colorimetric values 9 have regularity, the accuracy of the complementary operation and the accuracy of the input and output characteristic model 11 are improved even though the number of patch data items 7 is small unlike a case where the patch data items 7 arranged at equal intervals in the RGB color space are used.

Regularity of Arrangement of Equivalent Patch Data Items

Next, regularity of the arrangement of the equivalent patch data items 5 in the color space defined by the hue (H), the saturation (S), and the lightness (L) will be described. Hereinafter, the HSL color space and the HSV color space which are examples of the color space defined by the hue (H), the saturation (S), and the lightness (L) will be described.

Case of HSL Color Space

Figure 2:
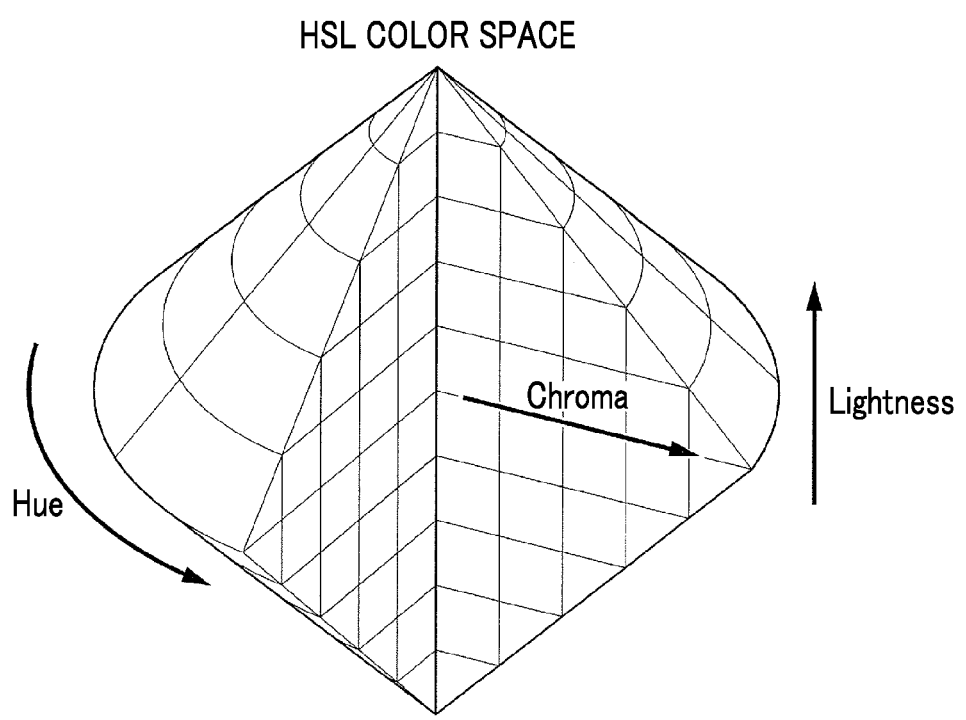
FIG. 2 is a diagram showing a biconic model of an HSL color space.

FIG. 2 is a diagram showing a biconic model of the HSL color space. As stated above, the HSL color space is a color space expressed by the lightness (L), the hue (H), and the saturation (S), and it is assumed that a vertical axis represents the lightness (L), a circumferential direction represents the hue (H), and a radial direction represents the saturation (S). The case of FIG. 2 means that the lightness (L) becomes greater from bottom to top in a vertical-axis direction. A case where positions in the circumferential direction are different means that hue (H) levels are different. A case where a radius of the cone is large means that the saturation (S) is dark.

Figure 3:
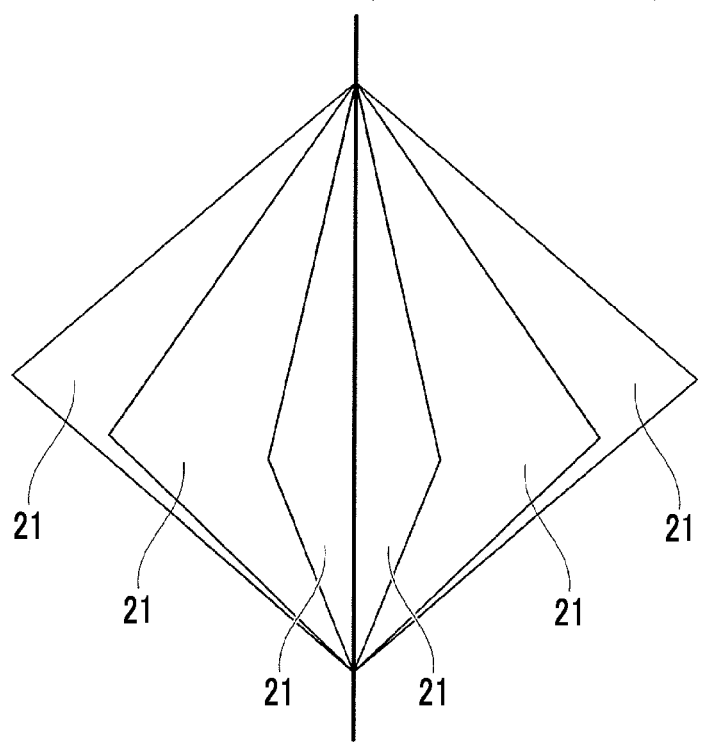
FIG. 3 is a diagram for describing an image of hue planes used in the present exemplary embodiment.

There are restrictions on the number of patches 3 constituting the patch chart 1. In the present exemplary embodiment, the multiple patches 3 arranged in the patch chart 1 are provided from twelve basic colors. FIG. 3 is a diagram for describing an image of hue planes 21 used in the present exemplary embodiment. At least a total of six or more colors including basic colors+two colors may be prepared as the hue planes 21. In the present exemplary embodiment, the hue planes 21 equivalent to twelve colors acquired by adding intermediate colors of the six colors to the six colors. All the equivalent patch data items 5 positioned on the same hue plane 21 have the same hue.

Figure 4:
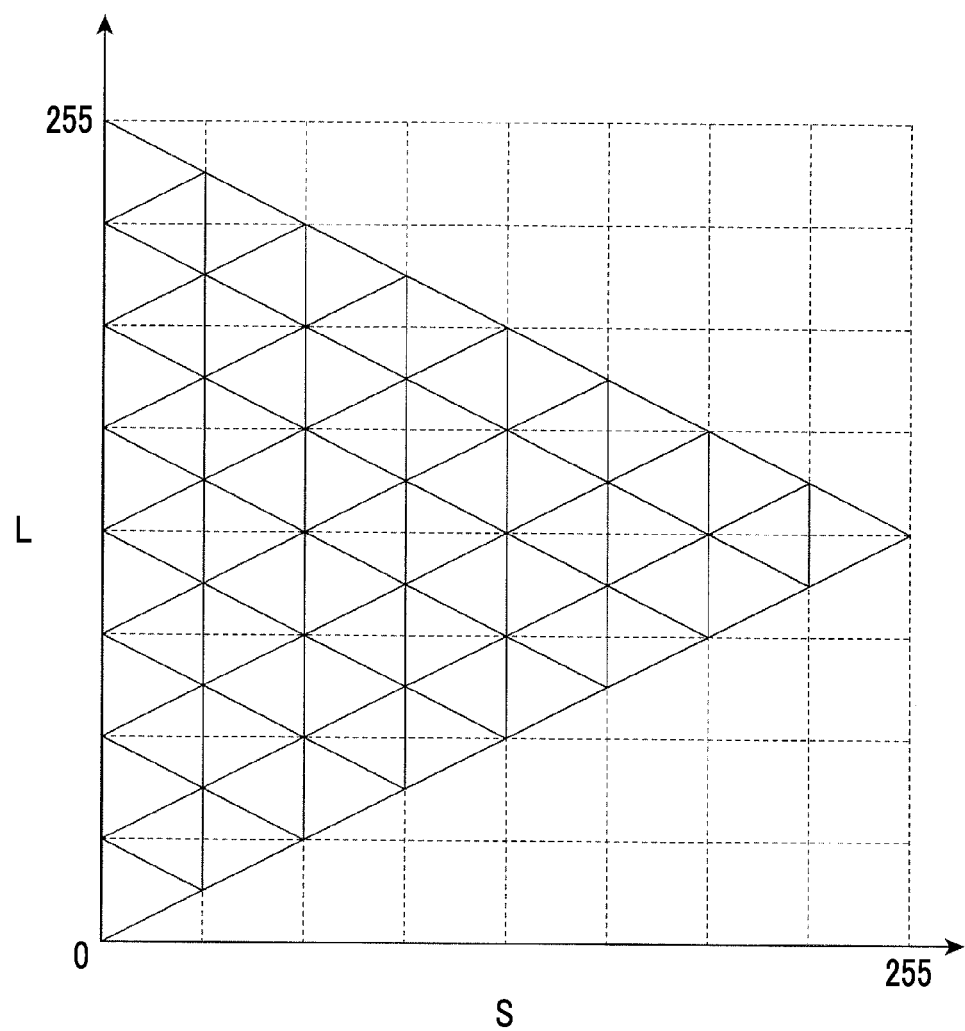
FIG. 4 is a diagram for describing an example of regularity defined on an individual hue plane.

FIG. 4 is a diagram for describing an example of regularity defined on an individual hue plane 21. Here, colors arranged in parallel in a saturation axis (represented as an S-axis in the drawing) represent a set of colors of which hue (H) levels and lightness (L) levels are the same. A lightness axis (represented as an L-axis in the drawing) includes a set of colors of which saturation (S) levels are zero (minimum gradation value), and represents a gray change (achromatic color).

In the case of FIG. 4, an outside edge of one hue plane 21 is represented by a large triangle acquired by connecting three points including a maximum gradation value in the lightness axis (255 on the L-axis), a maximum gradation value in the saturation axis (255 in the S-axis), and a minimum gradation value in the lightness axis (0 in the L-axis). In the present exemplary embodiment, it is considered that the hue plane 21 is divided at equal intervals in the lightness-axis direction and the saturation-axis direction. In FIG. 4, the axes are divided into eight. If the axis directions are equally divided, the number of divided lines in the saturation axis may be different from that in the lightness axis.

In the example of FIG. 4, an inside of the large triangle acquired by connecting three points including the maximum gradation value in the lightness axis (255 in the L-axis), the maximum gradation value in the saturation axis (255 in the S-axis), and the minimum gradation value in the lightness axis (0 in the L-axis) which define the hue plane 21 is divided into small triangles which are geometric shapes similar to the large triangle. Vertices of these small triangles are regularly arranged on the hue plane 21. In the present exemplary embodiment, a case where the equivalent patch data items 5 are arranged only in any of vertices of these small triangles means that the equivalent patch data items have regularity. In a case where the number of divided lines in the saturation axis is different from that in the lightness axis, a case where the equivalent patch data items 5 are arranged only in any of vertices of the geometric shapes that satisfy the division condition means that the equivalent patch data items have regularity.

Arrangement Example of Equivalent Patch Data Items

Hereinafter, an arrangement example of the equivalent patch data items 5 in a case where the color space defined by the hue (H), the saturation (S), and the lightness (L) is the HSL color space will be described.

Arrangement Example 1

Figure 5:
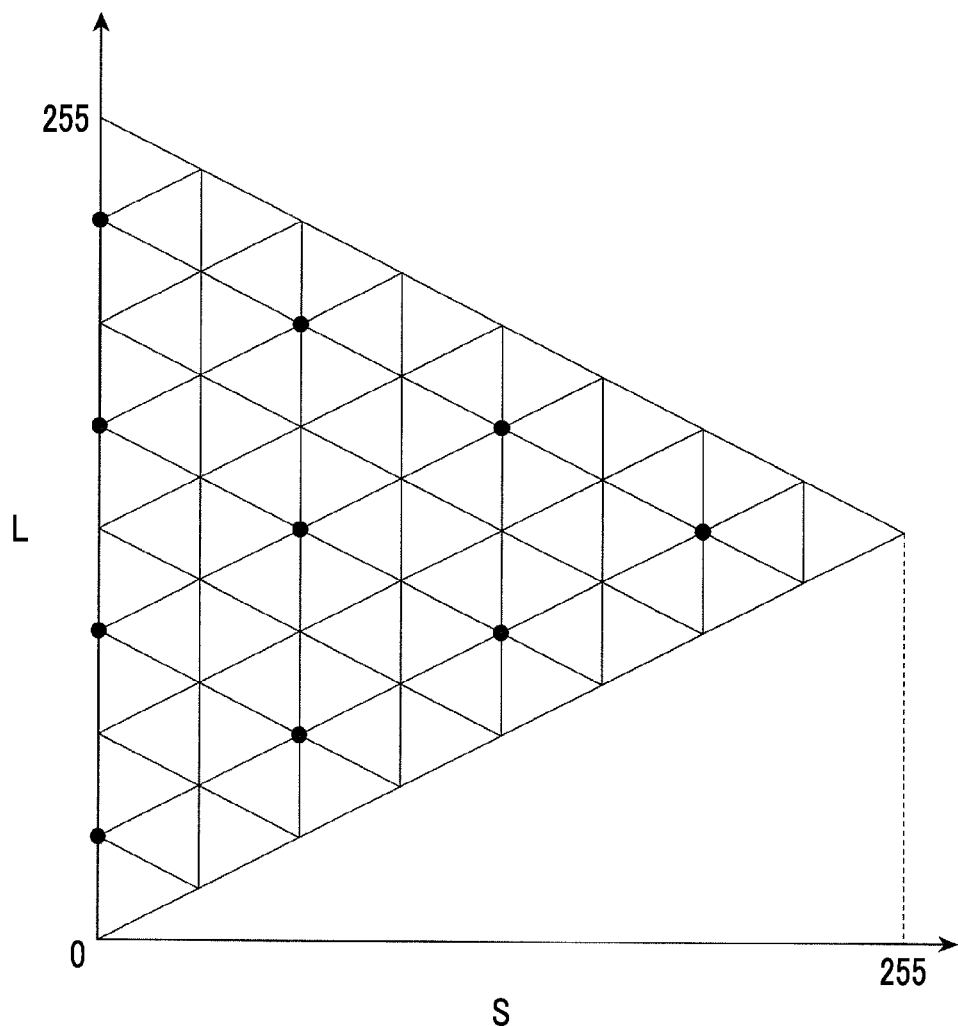
FIG. 5 is a diagram showing an example in which multiple equivalent patch data items are arranged such that the number of equivalent patch data items belonging to the same hue plane becomes smaller as the saturation becomes greater.

FIG. 5 is a diagram showing an example in which the multiple equivalent patch data items are arranged such that the number of equivalent patch data items 5 belonging to the same hue plane 21 becomes smaller as the saturation becomes greater. The RGB patch data items 7 corresponding to the equivalent patch data items 5 that satisfy the arrangement thereof are equivalent to an example of patch chart data items arranged so as to be positioned only in any of grid points of grid lines which divide the axes of the lightness (L) and the saturation (S) that define the hue plane 21 in the HSL color space at equal intervals. In the case of Arrangement Example 1, since many equivalent patch data items 5 are arranged near a gray color of which a color change is likely to be perceived in terms of human perception, even though the number of equivalent patch data items 5 is small (that is, even though the number of patch data items 7 is small), the accuracy of the complementary operation and the accuracy of the input and output characteristic model are improved.

Arrangement Example 2

Figure 6:
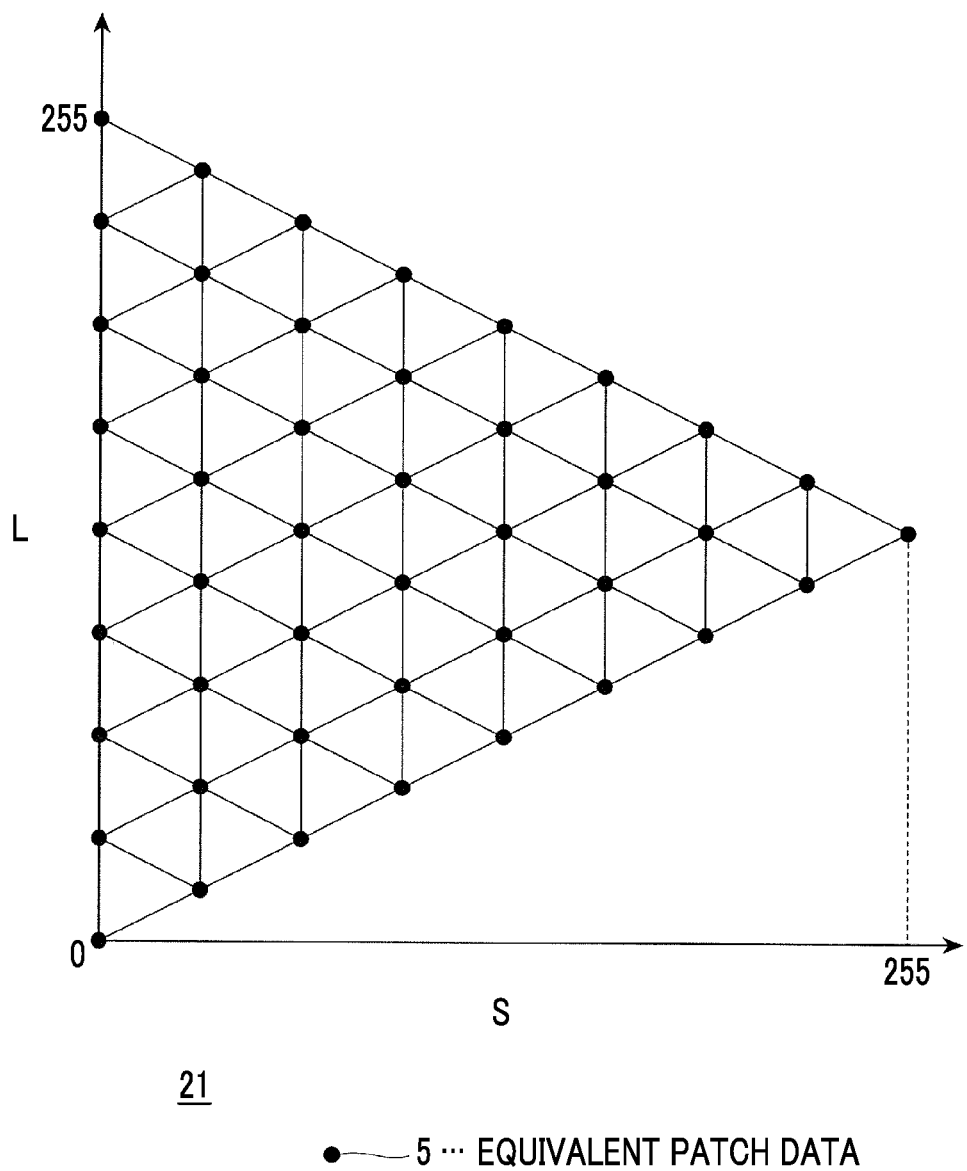
FIG. 6 is a diagram showing an example in which equivalent patch data items are arranged in all vertex positions of small triangles acquired by dividing the same hue plane.

FIG. 6 is a diagram showing an example in which the equivalent patch data items 5 are arranged in all vertex positions of the small triangles acquired by dividing the same hue plane 21. Similarly to Arrangement Example 1, this arrangement is one form of an example in which the equivalent patch data items are arranged such that the number of equivalent patch data items 5 becomes smaller as the saturation becomes greater. This arrangement is one form of an example in which the equivalent patch data items are arranged such that the number of equivalent patch data items 5 linearly becomes smaller as the saturation becomes greater. Arrangement Example 2 is one form of an example in which the largest equivalent patch data items 5 are arranged in the lightness axis and only one equivalent patch data item 5 is disposed in the maximum gradation value in the saturation axis (255 in the S-axis).

The RGB patch data items 7 corresponding to the equivalent patch data items 5 that satisfy the arrangement thereof are also equivalent to an example of the patch chart data items arranged so as to be positioned only in any of grid points of grid lines which divide the axes of the lightness (L) and the saturation (S) that define the hue plane 21 in the HSL color space at equal intervals. In the case of Arrangement Example 2, the equivalent patch data items 5 are densely arranged near a gray color of which a color change is likely to be perceived in terms of human perception. As a result, even though the number of equivalent patch data items 5 is small (that is, even though the number of patch data items 7 is small), the accuracy of the complementary operation and the accuracy of the input and output characteristic model are improved.

Arrangement Example 3

Figure 7:
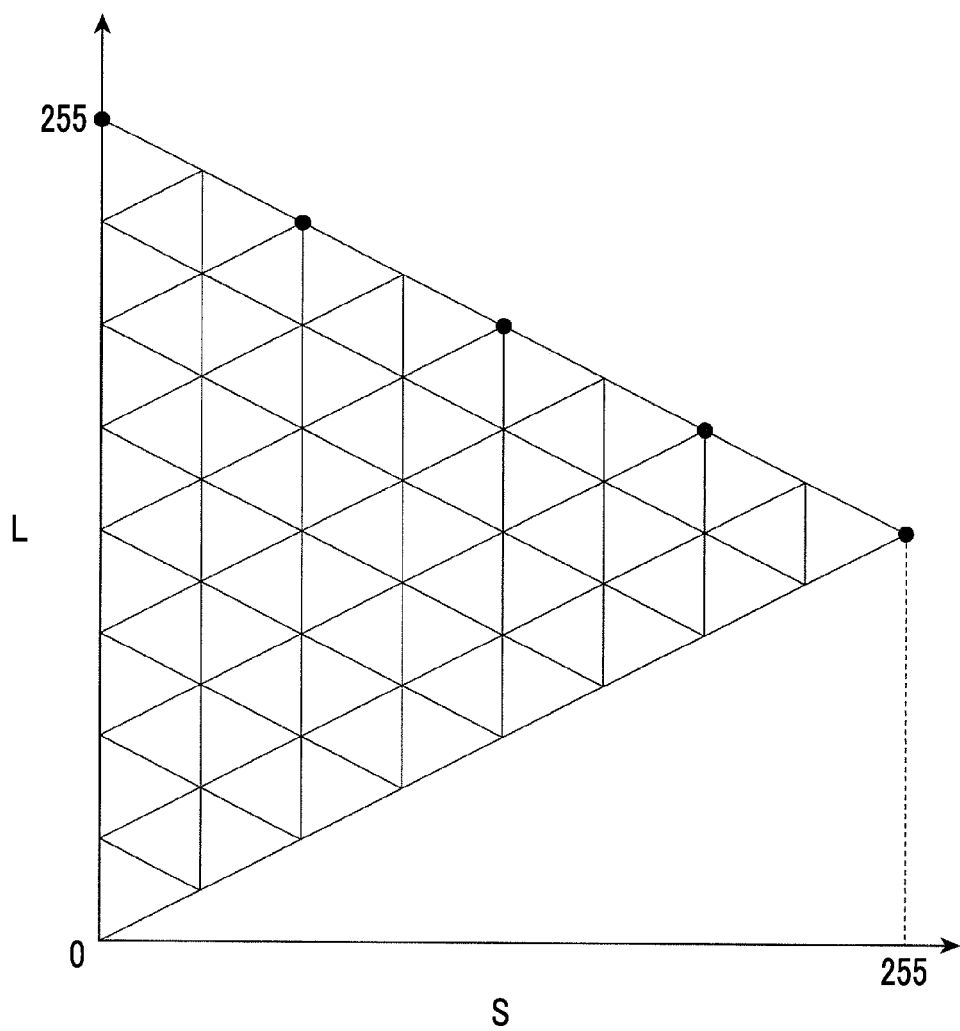
FIG. 7 is a diagram showing an example in which at least multiple equivalent patch data items are arranged in a line segment acquired by connecting a maximum gradation value in a lightness axis (255 in an L-axis) and a maximum gradation value in a saturation axis (255 in an S-axis) that define the same hue plane.
Figure 8:
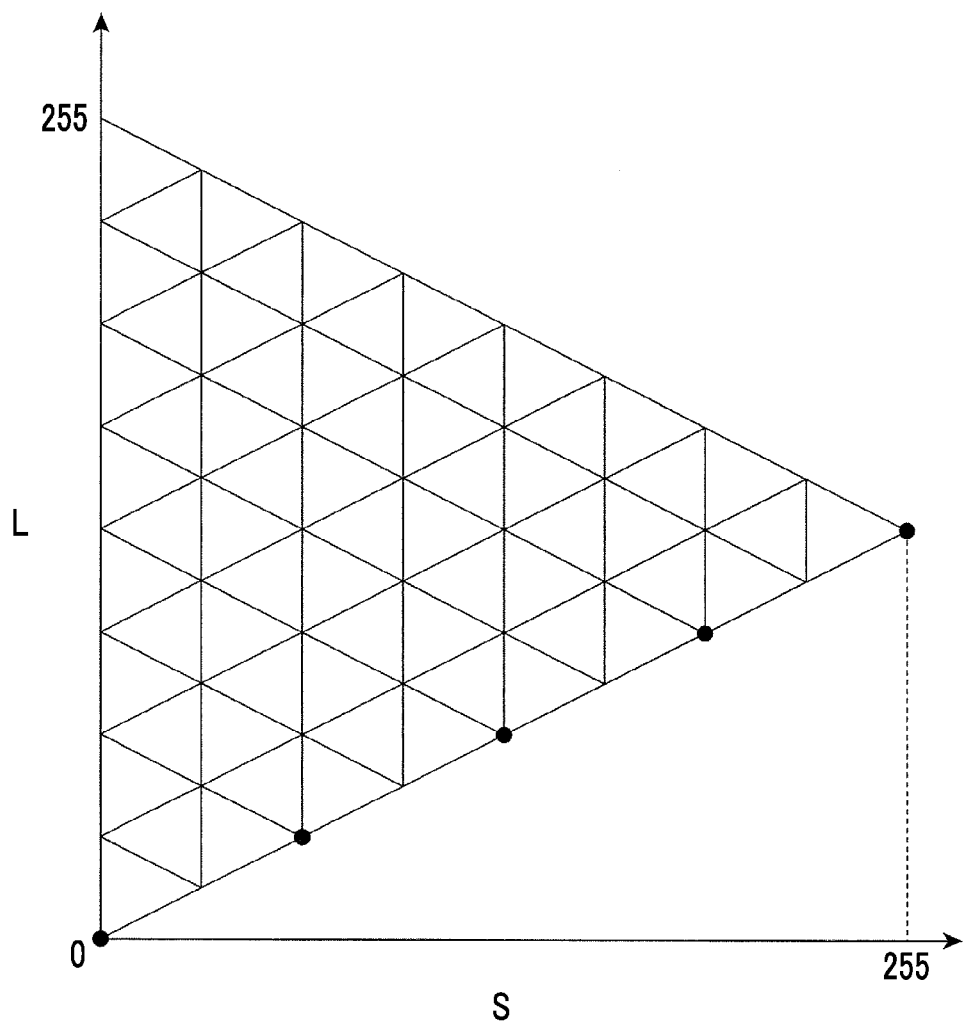
FIG. 8 is a diagram showing an example in which at least multiple equivalent patch data items are arranged in a line segment acquired by connecting a minimum gradation value in the lightness axis (0 in the L-axis) and the maximum gradation value in the saturation axis (255 in the S-axis)

Now, the arrangement of the equivalent patch data items 5 focusing on the outside edge of the hue plane 21 will be described. FIG. 7 is a diagram showing an example in which at least multiple equivalent patch data items 5 are arranged in a line segment acquired by connecting the maximum gradation value in the lightness axis (255 in the L-axis) and the maximum gradation value in the saturation axis (255 in the S-axis) that define the same hue plane 21. FIG. 8 is a diagram showing an example in which at least multiple equivalent patch data items 5 are arranged in a line segment acquired by connecting the minimum gradation value in the lightness axis (0 in the L-axis) and the maximum gradation value in the saturation axis (255 in the S-axis). In FIGS. 7 and 8, since the equivalent patch data items 5 arranged in the outside edge of the hue plane 21 are described, the equivalent patch data items 5 arranged in other grid points are omitted.

The arrangement shown in FIGS. 7 and 8 is one form of an example in which the equivalent patch data items 5 are arranged in a line segment acquired by connecting the maximum gradation value in the lightness axis (255 in the L-axis) and the maximum gradation value in the saturation axis (255 in the S-axis) or in a line segment acquired by connecting the minimum gradation value in the lightness axis (0 in the L-axis) and the maximum gradation value in the saturation axis (255 in the S-axis) at equal intervals.

The RGB patch data items 7 corresponding to the equivalent patch data items 5 that satisfy the arrangement thereof are equivalent to an example of patch chart data items arranged only in any of grid points of grid lines which divide the axes of the lightness (L) and the saturation (S) that define the hue plane 21 at equal intervals in the corresponding hue plane 21 in the HSL color space. In the case of Arrangement Example 3, the accuracy of the complementary operation and the accuracy of the input and output characteristic model in the outside edge of the hue plane 21 are also improved. Arrangement Example 3 is an example in which a part of Arrangement example 2 is focused on.

Arrangement Example 4

In the aforementioned arrangement examples, the arrangement examples employed in twelve hue planes 21 have been described. Thus, the twelve hue planes 21 may adopt any one of Arrangement Examples 1 to 3 or another arrangement example that satisfies regularity. At least two of the twelve hue planes 21 may adopt the same arrangement structure, and all the hue planes 21 may adopt the same arrangement structure.

Figure 10:
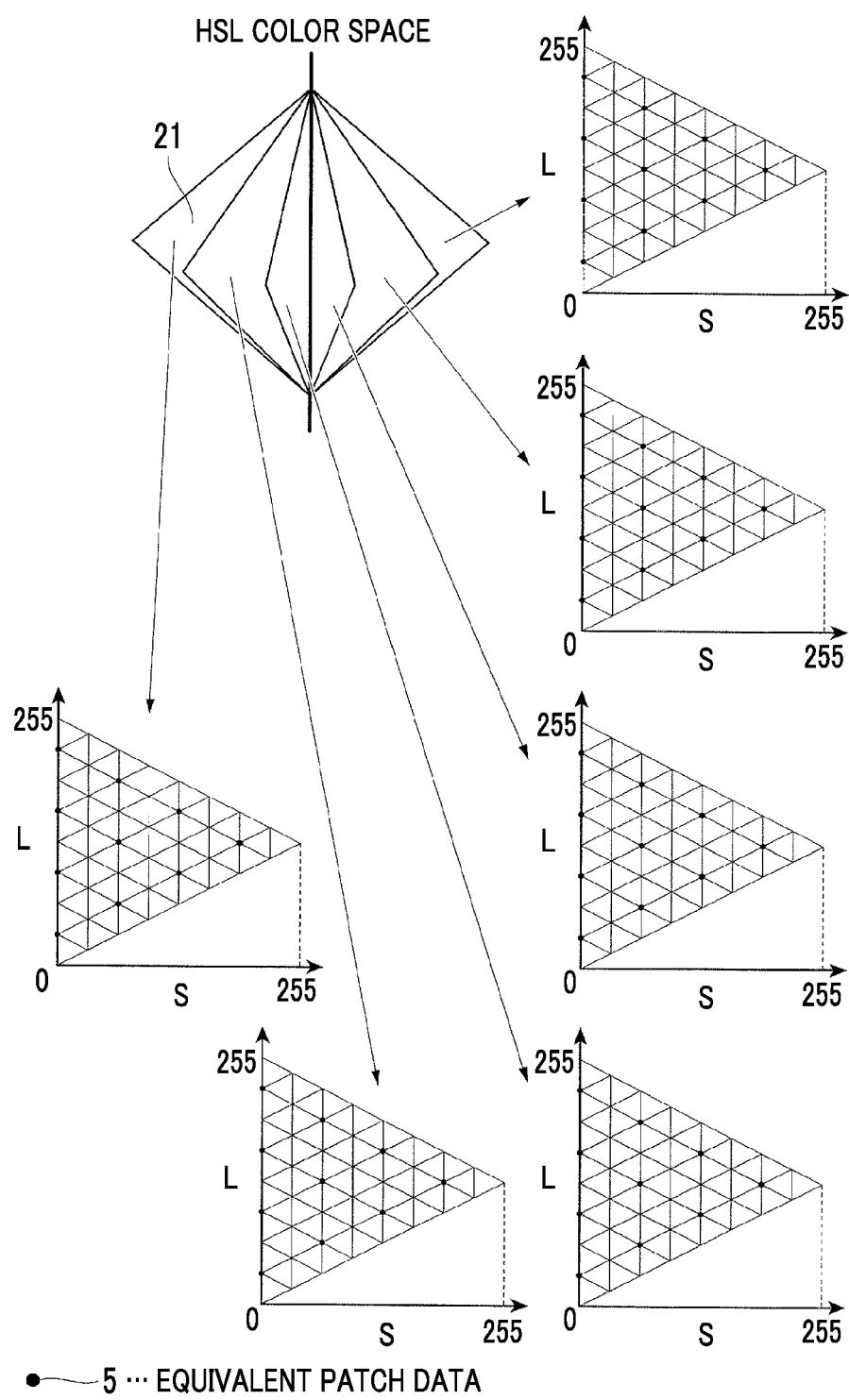
FIG. 10 is a diagram for describing an example in which all the twelve hue planes adopt the same arrangement of the equivalent patch data items.

FIG. 9 is a diagram showing an example in which two hue planes 21 of the twelve hue planes 21 adopt the same arrangement of the equivalent patch data items 5. One hue plane 21 of FIG. 9 is equivalent to a first hue plane corresponding to a first hue, and the other hue plane 21 is equivalent to a second hue plane corresponding to a second hue. FIG. 10 is a diagram for describing an example in which all the twelve hue planes 21 adopt the same arrangement of the equivalent patch data items 5. As mentioned above, the arrangement of the equivalent patch data items 5 is common to the multiple hue planes 21, and thus, the accuracy of the complementary operation and the accuracy of the input and output characteristic model are achieved in all the multiple hue planes 21.

Case of HSV Color Space

Figure 11:
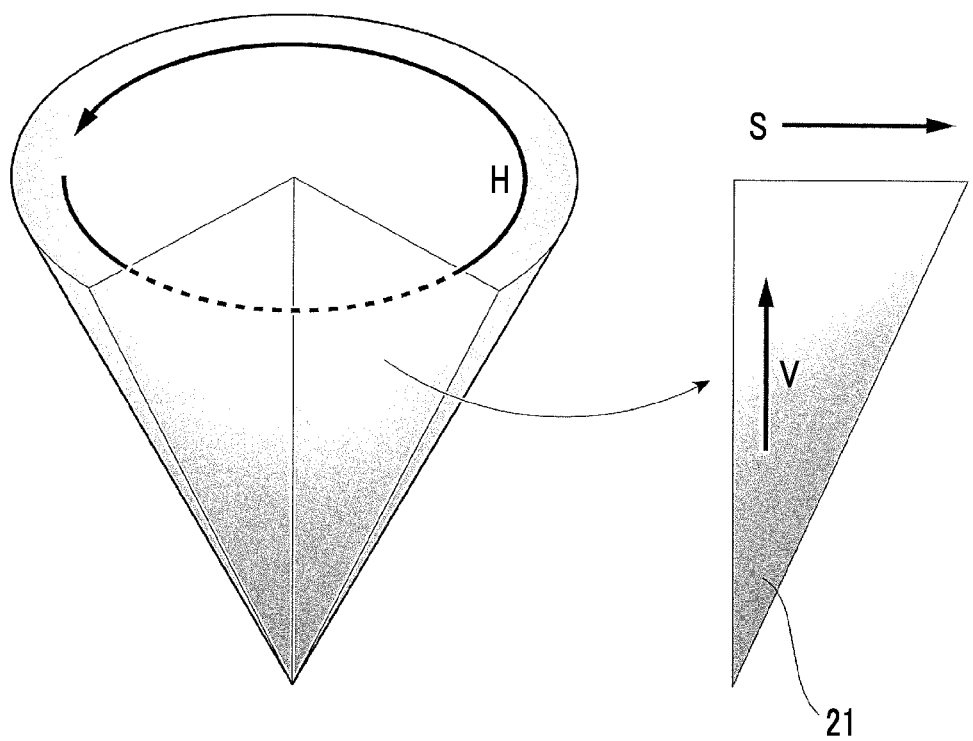
FIG. 11 is a diagram showing a conic model of an HSV color space.

FIG. 11 is a diagram showing a conic model of the HSV color space. As stated above, the HSV color space is also a color space expressed by the lightness (L), the hue (H), and the saturation (S), and it is assumed that a vertical axis represents value (V), a circumferential direction represents the hue (H), and a radial direction represents the saturation (S). A case of FIG. 11 means that the value (V) becomes greater from bottom to top in a vertical-axis direction. A case where positions in the circumferential direction are different means that hue (H) levels are different. A case where a radius of the cone is large means that the saturation (S) is dark.

In the HSV color space, multiple patches 3 constituting the patch chart 1 are also prepared for twelve basic colors. In FIG. 11, one of twelve hue planes 21 is shown. All the equivalent patch data items 5 positioned on the same hue plane 21 have the same hue.

Figure 12:
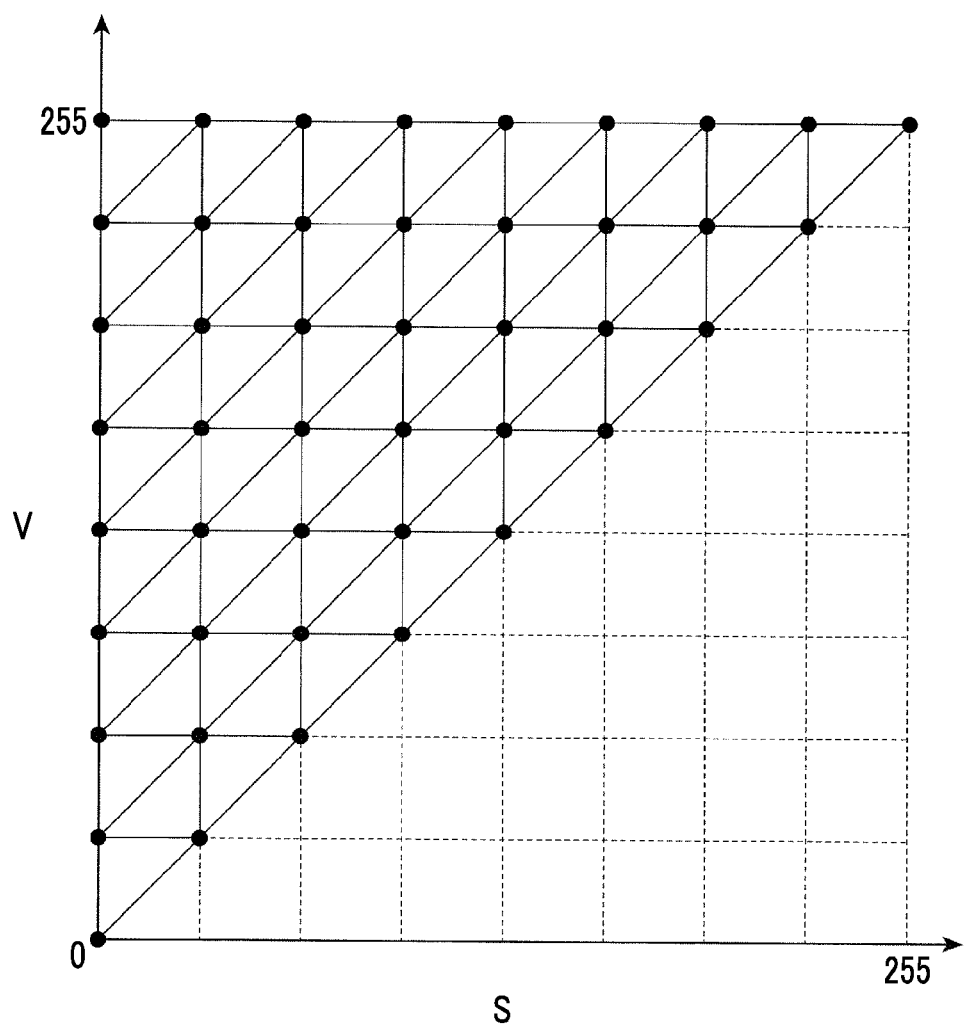
FIG. 12 is a diagram for describing an example in which the equivalent patch data items are regularly arranged on one hue plane in the HSV color space.

FIG. 12 is a diagram for describing an example in which the equivalent patch data items 5 are regularly arranged on one hue plane 21 in the HSV color space. Here, colors arranged in parallel in the saturation axis (represented as the S-axis in the drawing) represent a set of colors of which the hue (H) levels and value (V) levels are the same. A value axis (represented as a V-axis in the drawing) is a set of colors of which the saturation (S) levels are zero (minimum gradation value), and represents a gray change (achromatic color).

In the case of the hue plane 21 shown in FIG. 12, the outside edge of one hue plane 21 is represented by a large triangle acquired by connecting three points including the maximum gradation value in the value axis (255 in the V-axis), the maximum gradation value in the saturation axis (255 in the S-axis), and the minimum gradation value in the value axis (0 in the V-axis). Here, this case is different from the HSL color space (FIG. 4) in that the maximum gradation value in the saturation axis (255 in the S-axis) has the maximum gradation value in the value axis (255 in the V-axis).

In this example, it is also considered that the hue plane 21 is divided at equal intervals in the value-axis direction and the saturation-axis direction. If the axis directions are divided at equal intervals, the number of divided lines in the value axis and the number of divided lines in the saturation axis may be different. In a case where the number of divided lines in the saturation axis is different from that in the lightness axis, a case where the equivalent patch data items 5 are arranged only in any of vertices of the geometric shapes that satisfy the division condition means that the equivalent patch data items have regularity.

In the example of FIG. 12, an inside of the large triangle acquired by connecting three points including the maximum gradation value in the value axis (255 in the V-axis), the maximum gradation value in the saturation axis (255 in the S-axis), and the minimum gradation value in the value axis (0 in the V-axis) which define the hue plane 21 is divided into small triangles which are geometric shapes similar to the large triangle. Vertices of these small triangles are regularly arranged on the hue plane 21. In the present exemplary embodiment, a case where the equivalent patch data items 5 are arranged only in any of vertices of these small triangles means that the equivalent patch data items have regularity.

In the example of FIG. 12, the equivalent patch data items 5 are arranged in all the vertices. The RGB patch data items 7 corresponding to the equivalent patch data items 5 that satisfy the arrangement thereof are equivalent to an example of patch chart data items arranged so as to be positioned only in any of grid points of grid lines which divide the axes of the value (V) and the saturation (S) that define the hue plane 21 in the HSV color space at equal intervals. In the case of this arrangement example, the equivalent patch data items 5 are densely arranged near a gray color of which a color change is likely to be perceived in terms of human perception. As a result, even though the number of equivalent patch data items 5 is small (that is, even though the number of patch data items 7 is small), the accuracy of the complementary operation and the accuracy of the input and output characteristic model are improved.

Figure 13:
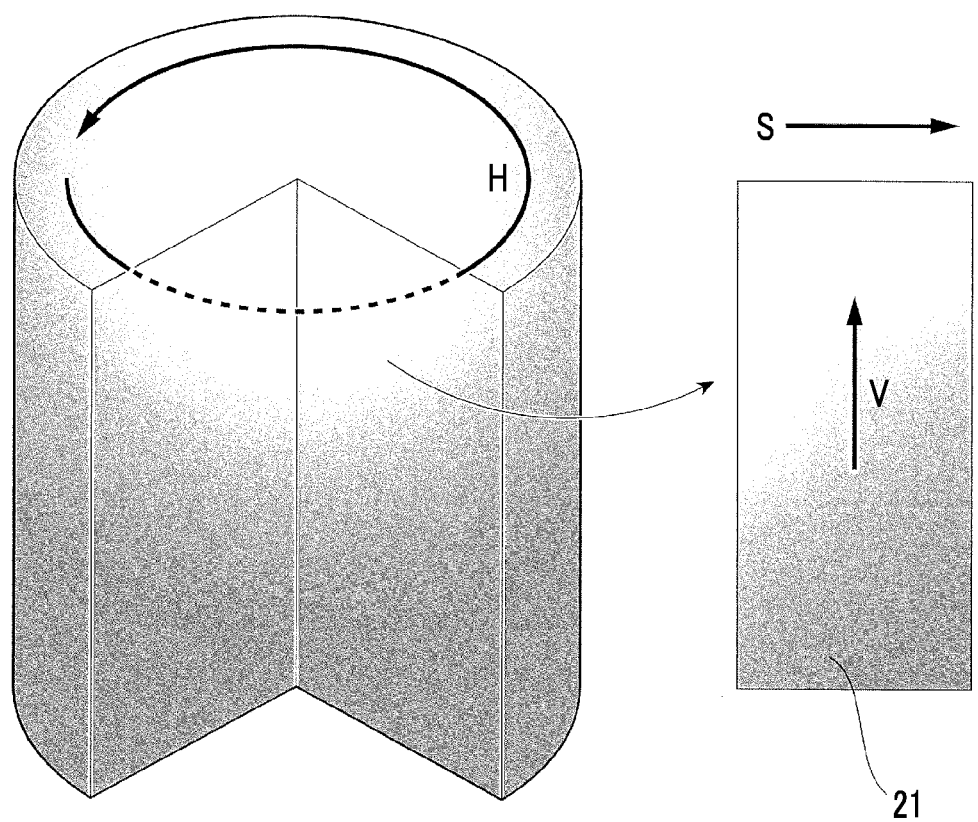
FIG. 13 is a diagram showing a cylindrical model of the HSV color space.

Incidentally, the HSV color space may be represented in another model form. FIG. 13 is a diagram showing a cylindrical model of the HSV color space. In the HSV color space shown in FIG. 13, it is also assumed that a vertical axis represents the value (V), a circumferential direction represents the hue (H), and a radial direction represents the saturation (S). A case of FIG. 13 means that the value (V) becomes greater from bottom to top in a vertical-axis direction. A case where positions in the circumferential direction are different means that hue (H) levels are different. A case where a radius of the cone is large means that the saturation (S) is dark.

In the HSV color space, multiple patches 3 constituting the patch chart 1 are also prepared for twelve basic colors. In FIG. 13, one of twelve hue planes 21 is shown. All the equivalent patch data items 5 positioned on the same hue plane 21 have the same hue.

Figure 14:
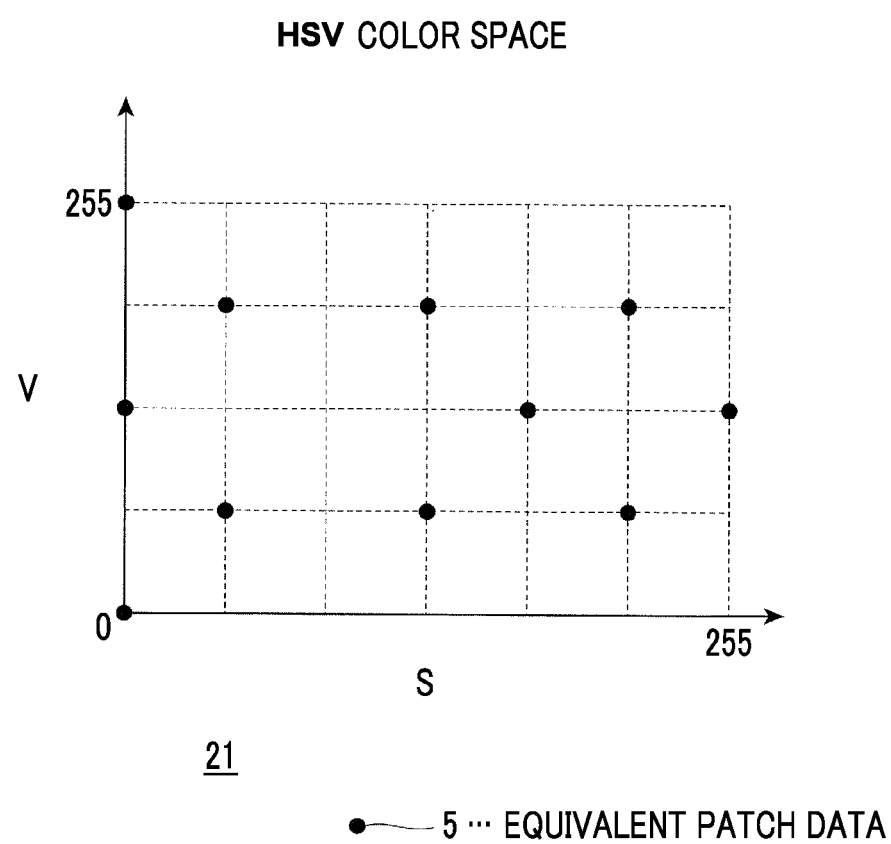
FIG. 14 is a diagram for describing an example in which the equivalent patch data items are regularly arranged on one hue plane in the HSV color space.

FIG. 14 is a diagram for describing an example in which the equivalent patch data items 5 are regularly arranged on one hue plane 21 in the HSV color space. Here, the saturation axis (represented as the S-axis in the drawing) represents a set of colors of which the hue (H) levels and the value (V) levels are the same. A value axis is a set of colors of which the saturation (S) levels are zero (minimum gradation value), and represents a gray change (achromatic color).

The hue plane 21 shown in FIG. 14 is represented by a rectangle acquired by connecting four points including the minimum gradation value in the saturation axis (0 in the S-axis) for the maximum gradation value in the value axis (255 in the V-axis), the maximum gradation value in the saturation axis (255 in the S-axis) for the maximum gradation value in the value axis (255 in the V-axis), the minimum gradation value in the saturation axis (0 in the S-axis) for the minimum gradation value in the value axis (0 in the V-axis), and the maximum gradation value in the saturation axis (255 in the S-axis) for the minimum gradation value in the value axis (0 in the V-axis).

In this example, it is also considered that the hue plane 21 is divided at equal intervals in the value-axis direction and the saturation-axis direction. In the example of FIG. 14, the number of divided lines in the value-axis direction and the number of divided lines in the saturation-axis direction may be different. If the axis directions are divided at equal intervals, the number of divided lines may be different in the axis directions.

In the example of FIG. 14, an inside of a large square acquired by connecting the four points that define an outside edge of the hue plane 21 is divided into small squares acquired by equally dividing the large square. Vertices of these small squares are regularly arranged on the hue plane 21. In the present exemplary embodiment, a case where the equivalent patch data items 5 are arranged only in any of vertices of these small squares means that the equivalent patch data items have regularity.

In the example of FIG. 14, an example in which three equivalent patch data items 5 are arranged in the value axis at equal intervals and two equivalent patch data items 5, two equivalent patch data items, one equivalent patch data item, two equivalent patch data items, and one equivalent patch data item are arranged in a direction in which the saturation is increased. Of course, other arrangements may be adopted as long as the equivalent patch data items are arranged in the vertices of the small squares. The RGB patch data items 7 corresponding to the equivalent patch data items 5 that satisfy the arrangement thereof are equivalent to an example of patch chart data items arranged only in any of grid points of grid lines which divide the axes of the value (V) and the saturation (S) that define the hue plane 21 at equal intervals in the corresponding hue plane 21 in the HSV color space. In this arrangement, the accuracy of the complementary operation and the accuracy of the input and output characteristic model are also improved.

Number of Divided Lines on Hue Planes

Although the present exemplary embodiment has a feature that regularly arranges the equivalent patch data items 5 on the hue planes 21 in the HSL color space or the HSV color space, there are restrictions on the number of divided lines in the saturation axis and the number of divided lines in the lightness axis constituting the hue plane 21 in terms of the arrangement of the patches 3.

Initially, the minimum number of divided lines in the saturation axis and the lightness axis constituting one hue plane 21 is 2. Next, the maximum value of the number of divided lines along each axis direction will be examined. Here, a case where the hue plane is divided into N along the saturation axis and the lightness axis is examined. In the case of FIG. 4, the number of vertices in a case where one hue plane 21 is divided into N in the saturation axis that defines the hue plane is given by N(N+1)/2. For example, in the case of N=8, the number of vertices is 8×9/2=36. Incidentally, the vertices in the lightness axis are excluded.

If it is considered that M number of hue planes 21 are prepared, the number of vertices present in M number of hue planes 21 is given by MN (N+1)/2. For example, in the case of M=12, the number of vertices is 12×36=432. Finally, if (N+1) number of vertices are added as the vertices in the lightness axis, a total of vertices is given by MN(N+1)/2+ (N+1). In the case of the above-described example, since the number of vertices in the lightness axis is 9, the total number of vertices is 432+9=441.

Figure 15:
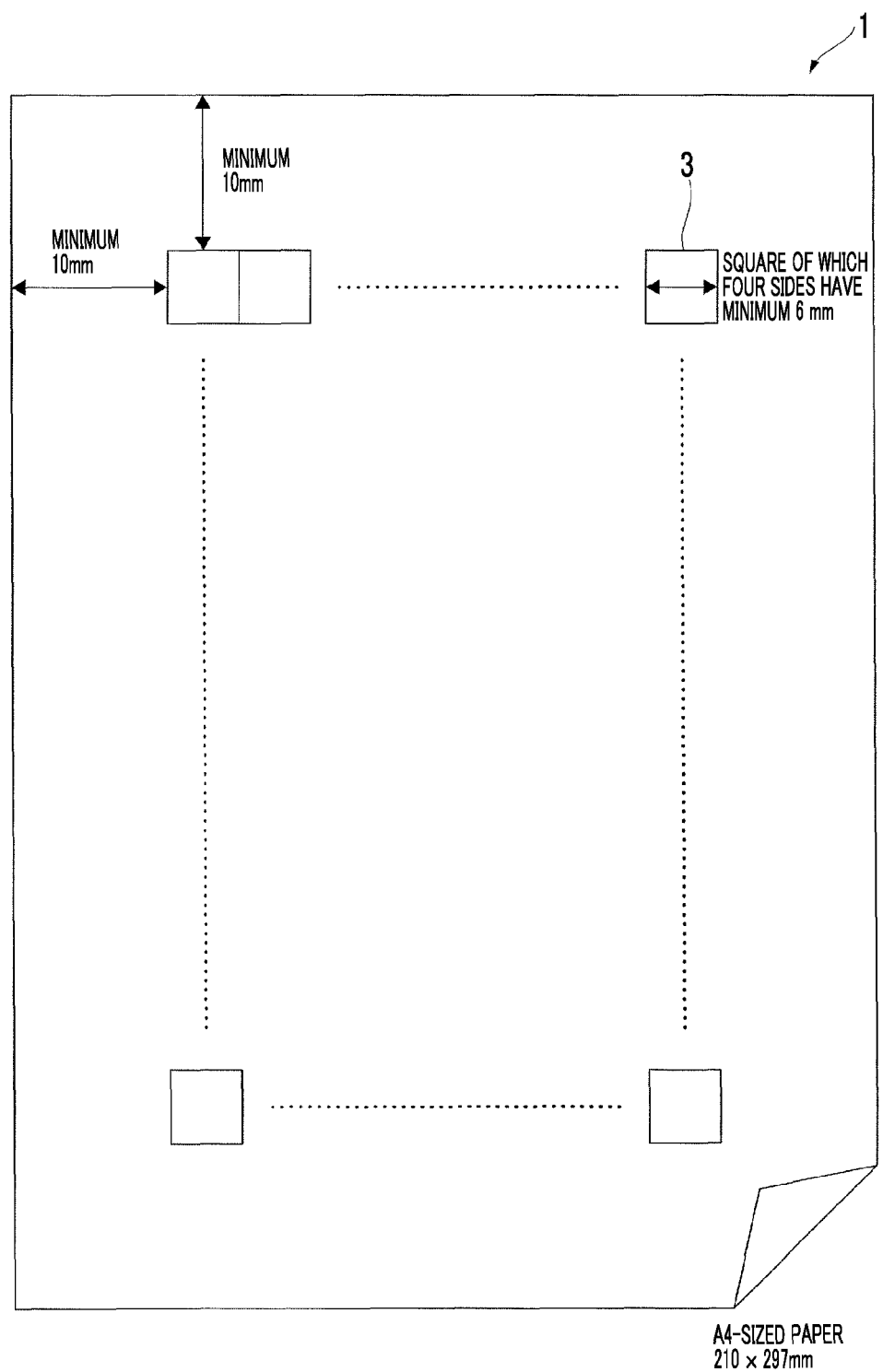
FIG. 15 is a diagram showing a condition acquired in a case where the patch chart is printed on A4-sized paper.

For example, the patch chart 1 constituted by as many patches 3 as 441 vertices are printed on paper by the printing device. FIG. 15 is a diagram showing a condition acquired in a case where the patch chart 1 is printed on A4-sized paper. In a case where the patch chart 1 is printed on A4-sized paper, if a range of 10 mm from an edge of the paper is used as a margin, an area in which the patch chart 1 is able to be disposed is 190×277 mm. A minimum printing size of the patch 3 is at least a square of which four sides have 6 mm. Thus, the number of patches 3 arranged in directions of the sides is 31 in a transverse direction and is 46 in a longitudinal direction.

That is, the maximum number of patches 3 arranged in the area in which the patch chart is able to be disposed is 1426 (=31×46). That is, the number of vertices is necessary to satisfy the following expression.

$$MN(N+1)/2+(N+1) \leq 1426 \quad \text{Expression 1}$$

M and N that satisfy this expression are estimated. The minimum number of hue planes 21 is 6. Thus, if M=6, Expression 1 is transformed to the following expression.

$$3N(N+1)+(N+1) \leq 1426 \quad \text{Expression 2}$$

If Expression 2 is arranged, N≤21. That is, if it is considered that the number of patches 3 to be arranged on the paper has restrictions, the number of divided lines in the axes is 2 to 21. Of course, the number of divided lines is limited to a case of the above-described condition, and the number of divided lines is different depending on a size of the printing paper or a dimension of the margin.

Image Forming Device

Figure 16:
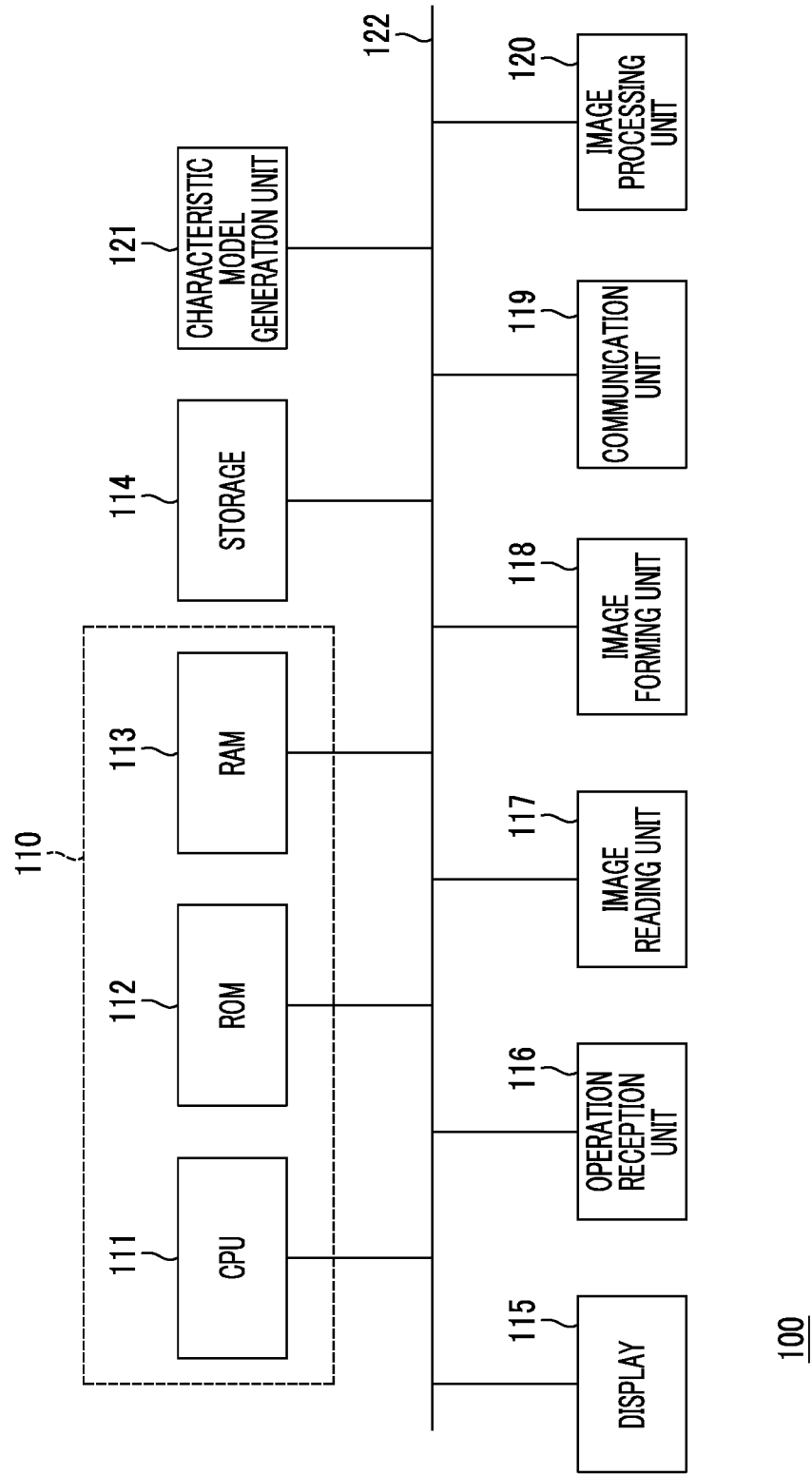
FIG. 16 is a diagram showing a configuration example of an image forming device that forms the patch chart on a recording material and generates an input and output characteristic model from the colorimetric results.

FIG. 16 is a diagram showing a configuration example of an image forming device 100 that forms the patch chart 1 on a recording material and generates the input and output characteristic model 11 from the colorimetric results. The image forming device 100 includes a controller 110 that controls the entire device, a storage 114 that stores input data including the patch chart 1, a display 115 that is used for displaying an operation reception screen or a still image, an operation reception unit 116 that receives an input operation of a user, an image reading unit 117 that reads an image of an original document set onto an image reading surface, an image forming unit 118 that forms an image on paper which is an example of the recording material, for example, by an electrophotographic method and an inkjet method, a communication unit 119 that is used in communication with an external device, an image processing unit 120 that performs image processing such as color correction and gradation correction on an image indicating image data, and a characteristic model generation unit 121 that generates the input and output characteristic model 11 by using data items corresponding to the patch data items 7 in the color space defined by the hue, the lightness, and the saturation. These units are connected to a bus 122, and transmit and receive data through the bus 122. The image forming device 100 is an example of an image control device.

The controller 110 functions as a so-called computer, and is constituted by a central processing unit (CPU) 111, a read-only memory (ROM) 112, and a random-access memory (RAM) 113. The controller 110 is an example of a control unit. The ROM 112 stores a program to be executed by the CPU 111. The CPU 111 reads the program stored in the ROM 112, and executes the program by using the RAM 113 as a work area. The units of the image forming device 100 are controlled by executing the program. For example, the forming of the image on a paper surface and the generation of the read image are controlled.

The storage 114 is constituted by a hard disk device or a storage device such as a semiconductor memory. As stated above, the storage 114 stores the patch chart data items which are the RGB patch data items 7 regularly arranged on the hue plane 21 in the HSL color space or the HSV color space. The patch chart data items may be read from an external storage medium (for example, a Universal Serial Bus (USB) memory) or through a communication unit when the patch chart 1 is printed. The patch chart data items may be previously stored in the storage 114. In both cases, the patch chart data items pass through a reception unit. The storage 114, the communication unit 119, and the bus 122 are an example of the reception unit of the patch chart data items.

The display 115 is a display device that displays various images by executing a program (including operating system or firmware). For example, the display 115 is constituted by a liquid crystal display panel or an organic electroluminescence (EL) display panel. The operation reception unit 116 is a device that receives an operation from the user, and is constituted, for example, by a button, a switch, or a touch panel. In the present exemplary embodiment, the operation reception unit 116 is used for receiving an output operation of the patch chart 1.

The image reading unit 117 is a so-called scanner device. The image reading unit 117 is an example of a colorimetry unit used in colorimetry of the patch chart 1 printed on the paper, that is, in colorimetry of the patches 3. The colorimetric values 9 acquired by the image reading unit 117 are output as color data items in the Lab color space to the characteristic model generation unit 121. The image reading unit 117 may be integrally provided on a top surface of the device, or may be used while being pulled out of a main member like a hand scanner.

For example, the image forming unit 118 is a print engine that forms an image on the paper which is an example of the recording material, and is an example of an image forming unit. For example, the communication unit 119 is constituted by a reading device such as an external memory or a local area network (LAN) interface. In a case where image data corresponding to the patch chart data item is input from the outside, the communication unit 119 is used. For example, the image processing unit 120 is constituted by a dedicated processor that performs image processing such as color correction or gradation correction on the image data.

The characteristic model generation unit 121 generates a correspondence table 200 (FIG. 17) of the RGB patch data items 7 used for printing the patch chart 1, the equivalent patch data items 5 in the corresponding HSL color space or the HSV color space, and the colorimetric values 9 of the patches 3, calculates the approximate expression (relational expression) established between the equivalent patch data items 5 and the colorimetric values 9, calculates color values in the Lab color space by substituting HSL values corresponding to RGB values constituting a multidimensional input correspondence table (color conversion table) for the approximate expression (relational expression), and generates the input and output characteristic model 11 (FIG. 1).

Figure 17:
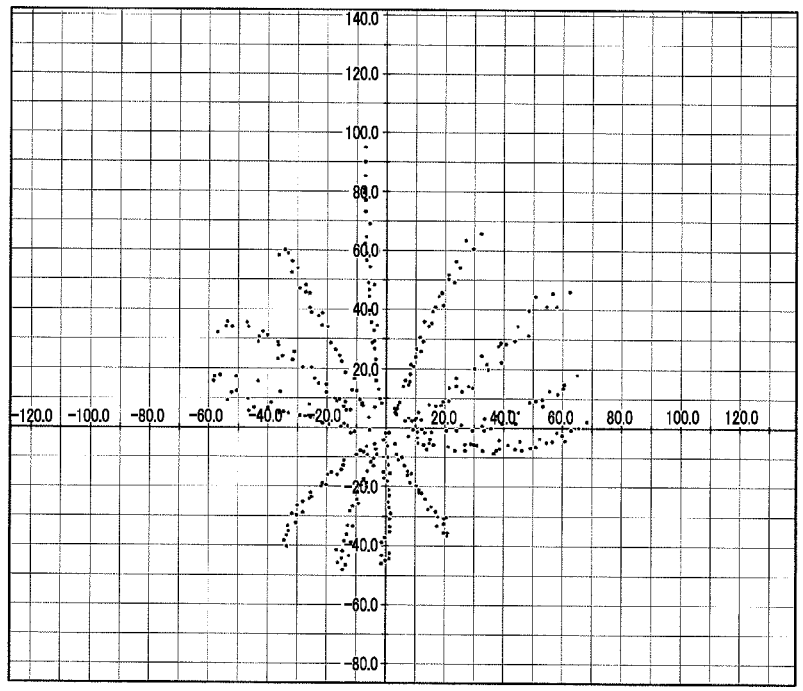
FIG. 17 is a diagram for describing a data structure of a correspondence table which is generated using colorimetric values of the patch chart before a complementary operation is performed.

FIG. 17 is a diagram for describing a data structure of the correspondence table 200 which is generated using the colorimetric values 9 of the patch chart 1 before a complementary operation is performed. FIG. 17 shows a case where the equivalent patch data items 5 are defined in the HSL color space. Thus, in FIG. 17, color data items corresponding to the equivalent patch data items 5 are described as the HSL values.

As mentioned above, the equivalent patch data items 5 are arranged in the grid points specified by the grid lines that divide twelve hue planes 21 in the HSL color space into eight along the saturation axis and the lightness axis. Accordingly, the correspondence table 200 shown in FIG. 17 is constituted by 441 data rows, as mentioned above. In a case where the patch chart data items are previously stored in the storage 114, the RGB patch data items 7 and the corresponding equivalent patch data items 5 may be stored in the correspondence table 200 in a state in which these data items are associated with each other.

For reference, an example in which the RGB values (patch data items 7) are acquired from the regularly arranged HSL values (equivalent patch data items 5) is described. Initially, a maximum value mx and a minimum value mn are calculated by Expression 3 and Expression 4.

$$mx = L + S/2 \qquad \text{Expression 3}$$

$$mn = L - S/2 \qquad \text{Expression 4}$$

Subsequently, a classification $H_0$ of the hue (H) and a ratio $H_1$ within the division are calculated by Expression 5 and Expression 6. Here, the hue (H) is given as a value which is equal to or greater than 0 and is less than 6.

$$H_0 = \text{int}(H) \qquad \text{Expression 5}$$

$$H_1 = H - H_0 \qquad \text{Expression 6}$$

Here, a function int is a function that truncates a decimal pint of the hue (H).

As for each classification $H_0$, an intermediate value md is calculated as follows.
When $H_0 = 0$, 2, or 4: $md = mn + (mx-mn)H_1$
When $H_0 = 1$, 3, or 5: $md = mx - (mx-mn)H_1$
When $H = -1$: $md = mn$
With above, if mx, mn, and md are calculated, the R value, the B value, and the G value are given as follows.
When $H_0 = 0$: (R, G, B) = (mx, md, mn)
When $H_0 = 1$: (R, G, B) = (md, mx, mn)
When $H_0 = 2$: (R, G, B) = (mn, mx, md)
When $H_0 = 3$: (R, G, B) = (mn, md, mx)
When $H_0 = 4$: (R, G, B) = (md, mn, mx)
When $H_0 = 5$: (R, G, B) = (mx, mn, md)
When $H_0 = -1$: (R, G, B) = (mn, mn, mn)
For example, in a case where (H, S, L) = (3.5, 20, 70), mx=80, mn=60, and $H_0=3$. In this case, md is 70 (=80−(80−60)×0.5). Thus, (R, G, B) = (60, 70, 80).

In a case where the RGB patch data items 7 acquired in this manner are provided from the outside, all the equivalent patch data items 5 used in the conversion may be provided. Here, in a case where only the RGB patch data items 7 are provided, the characteristic model generation unit 121 calculates the equivalent patch data items 5 in the HSL color space corresponding to the RGB patch data items 7 by using the known arithmetic expression, and stores the calculated equivalent patch data items in the correspondence table 200.

For reference, an example of a conversion expression in which the HSL values (equivalent patch data items 5) are acquired from the RGB values (patch data items 7) is described. Initially, the relationship between the R value, the G value, and the B value in magnitude is calculated by Expression 7 to Expression 9.

$$mx = \max(R, G, B) \qquad \text{Expression 7}$$

$$mn = \min(R, G, B) \qquad \text{Expression 8}$$

$$md = \text{mid}(R, G, B) = R + G + B - mx - mn \qquad \text{Expression 9}$$

In this case, the saturation (S) and the lightness (L) are given by Expression 10 and Expression 11.

$$S = mx - mn \qquad \text{Expression 10}$$

$$L = (mx + mn)/2 \qquad \text{Expression 11}$$

The hue (H) is given by Expression 12.

$$H = H_0 + H_1 \qquad \text{Expression 12}$$

Here, H0 is a value determined for six classifications determined by the relationship between the R value, the G value, and the B value in magnitude, and is given as follows.
When $R \geq G \geq B$: $H_0 = 0$
When $G > R \geq B$: $H_0 = 1$
When $G \geq B \geq R$: $H_0 = 2$
When $B > G > R$: $H_0 = 3$
When $B \geq R \geq G$: $H_0 = 4$
When $R > B > G$: $H_0 = 5$
For example, a case where R=G=B is handled as a special case, and it is assumed that $H_0 = -1$. $H_1$ given as the ratio within the classification is given as follows depending on a value of $H_0$.
When $H_0$ is 0, 2, or 4: $H_1 = (md-mn)/(mx-mn)$
When $H_0$ is 1, 3, or 5: $H_1 = (mx-md)/(mx-mn)$
When $H_0$ is −1: $H_1 = 0$
For example, in a case where (R, G, B) = (60, 70, 80), mx=80, mn=60, and md=70. Accordingly, the saturation (S) is 20, and the lightness (L) is 70. $H_0=3$, and $H_1=0.5$ (=(80−70)/(80−60)). Thus, the hue (H) is 3.5.

The characteristic model generation unit 121 inserts the colorimetric values 9 of the patch chart 1 read by the image reading unit 117 into corresponding portions of the correspondence table 200 (FIG. 17), and completes pre-processing for performing a supplementary process. Thereafter, the characteristic model generation unit 121 acquires the approximate expression (relational expression) established between the HSL values and the corresponding colorimetric values 9. As stated above, since the structures of the HSL color space and the Lab color space are similar, a high-accuracy approximate expression (relational expression) is acquired.

For reference, an example of a method of acquiring the approximate expression (relational expression) is described. In the following description, the gradation values of the saturation axis (S-axis) and the lightness axis (L-axis) that define a certain hue plane 21 are described as x and y. Initially, if the L value in the Lab color space is expressed by a cubic polynomial expression of x and y, Expression 13 is acquired. $L_0$ to $L_9$ are undetermined coefficients.

$$L = L_0 + L_1 x + L_2 y + L_3 x^2 + L_4 xy + L_5 y^2 + L_6 x^3 + L_7 x^2 y + L_8 xy^2 + L_9 y^3$$

$$= L(x, y) = \sum_{j=0}^{9} L_j n_j(x, y)$$

Expression 13

Here, the undetermined coefficients L0 to L9 of the polynomial expression of Expression 13 are calculated by a least squares method. In a squared error U given in Expression 14, L^ (^ is notation on L in Expression 14) is an L component of the colorimetric value 9. $x_k$ and $y_k$ to which a variable k is assigned correspond to the saturation values and the lightness values of 441 equivalent patch data items 5.

$$U = \frac{1}{2} \sum_{k=1}^{data} \left( L(x_k, y_k) - \hat{L}_k \right)^2$$

Expression 14

Subsequently, a partial derivative of the squared error U is performed, and a value thereof is 0.

$$\frac{\partial U}{\partial L_i} = \sum_{k=1}^{data} \left( L(x_k, y_k) - \hat{L}_k \right) n_i(x_k, y_k)$$

$$= \sum_{k=1}^{data} \sum_{j=0}^{9} L_j n_j(x_k, y_k) n_i(x_k, y_k) - \sum_{k=1}^{data} \hat{L}_k n_i(x_k, y_k)$$

$$= \sum_{j=0}^{9} \left( \sum_{k=1}^{data} n_i(x_k, y_k) n_j(x_k, y_k) \right) L_j - \sum_{k=1}^{data} n_i(x_k, y_k) \hat{L}_k = 0$$

Expression 15

If Expression 15 is arranged, a matrix P and a vector Q are determined, and a simultaneous equation for the undetermined coefficients $L_0$ to $L_9$ is acquired.

$$\begin{bmatrix} P_{00} & \cdots & \cdots & P_{09} \\ \vdots & \ddots & & \vdots \\ & & P_{ij} & \\ \vdots & & \ddots & \vdots \\ P_{90} & \cdots & \cdots & P_{99} \end{bmatrix} \begin{Bmatrix} L_0 \\ \vdots \\ L_i \\ \vdots \\ L_9 \end{Bmatrix} = \begin{Bmatrix} Q_0 \\ \vdots \\ Q_i \\ \vdots \\ Q_9 \end{Bmatrix}$$

Expression 16

Here, $P_{ij}$ and $Q_i$ are given as follows.

$$P_{ij} = \sum_{k=1}^{data} n_i(x_k, y_k) n_j(x_k, y_k)$$

$$Q_i = \sum_{k=1}^{data} n_i(x_k, y_k) \hat{L}_k$$

Similarly to Expression 13, if the a value in the Lab color space is expressed by a cubic polynomial expression of x and y, Expression 17 is acquired.

$$a = a_0 + a_1 x + a_2 y + a_3 x^2 + a_4 xy + a_5 y^2 + a_6 x^3 + a_7 x^2 y + a_8 xy^2 + a_9 y^3$$

$$= a(x, y) = \sum_{j=0}^{9} a_j n_j(x, y)$$

Expression 17

In this case, a simultaneous equation for undetermined coefficients $a_0$ to $a_9$ is acquired by Expression 18.

$$\begin{bmatrix} P_{00} & \cdots & \cdots & P_{09} \\ \vdots & \ddots & & \vdots \\ & & P_{ij} & \\ \vdots & & \ddots & \vdots \\ P_{90} & \cdots & \cdots & P_{99} \end{bmatrix} \begin{Bmatrix} L_0 \\ \vdots \\ L_i \\ \vdots \\ L_9 \end{Bmatrix} = \begin{Bmatrix} R_0 \\ \vdots \\ R_i \\ \vdots \\ R_9 \end{Bmatrix}$$

Expression 18

Here, $R_i$ is given as follows.

$$R_i = \sum_{k=1}^{data} n_i(x_k, y_k) \hat{a}_k$$

Similarly, if the b value in the Lab color space is expressed by a cubic polynomial expression of x and y, Expression 19 is acquired.

$$b = b_0 + b_1 x + b_2 y + b_3 x^2 + b_4 xy + b_5 y^2 + b_6 x^3 + b_7 x^2 y + b_8 xy^2 + b_9 y^3$$

$$= b(x, y) = \sum_{j=0}^{9} b_j n_j(x, y)$$

Expression 19

In this case, a simultaneous equation for undetermined coefficients $b_0$ to $b_9$ is given by Expression 20.

$$\begin{bmatrix} P_{00} & \cdots & \cdots & P_{09} \\ \vdots & \ddots & & \vdots \\ & & P_{ij} & \\ \vdots & & \ddots & \vdots \\ P_{90} & \cdots & \cdots & P_{99} \end{bmatrix} \begin{Bmatrix} L_0 \\ \vdots \\ L_i \\ \vdots \\ L_9 \end{Bmatrix} = \begin{Bmatrix} S_0 \\ \vdots \\ S_i \\ \vdots \\ S_9 \end{Bmatrix} \quad \text{Expression 20}$$

Here, $S_i$ is given as follows.

$$S_i = \sum_{k=1}^{data} n_i(x_k, y_k) \hat{b}_k$$

Thus, if Expression 16, Expression 18, and Expression 20 are arranged, Expression 21 is acquired.

$$\begin{bmatrix} P_{00} & \cdots & P_{09} \\ \vdots & \ddots & \vdots \\ P_{90} & \cdots & P_{99} \end{bmatrix} \begin{Bmatrix} L_0 & a_0 & b_0 \\ \vdots & \vdots & \vdots \\ L_9 & a_9 & b_9 \end{Bmatrix} = \begin{Bmatrix} Q_0 & R_0 & S_0 \\ \vdots & \vdots & \vdots \\ Q_9 & R_9 & S_9 \end{Bmatrix} \quad \text{Expression 21}$$

Here, if an inverse matrix of a common coefficient matrix P multiplies both sides, the undetermined coefficients $L_0$ to $L_9$ of Expression 13, the undetermined coefficients $a_0$ to $a_9$ of Expression 17, and the undetermined coefficients $b_0$ to $b_9$ of Expression 19 are acquired at a time. If the undetermined coefficients are calculated, three approximate expressions (relational expressions) for calculating the L value, the a value, and the b value are acquired from the HSL values. Although the above description has been described using the inverse matrix, Gaussian elimination is used in actual calculation. Since these values are positively symmetric, Cholesky decomposition may be used.

FIG. 17 shows a result acquired by projecting 441 colorimetric values 9 on an a-b surface in the Lab color space for reference. The colorimetric values 9 are arranged with regularity, as represented on the a-b surface shown in FIG. 17.

Figure 18:
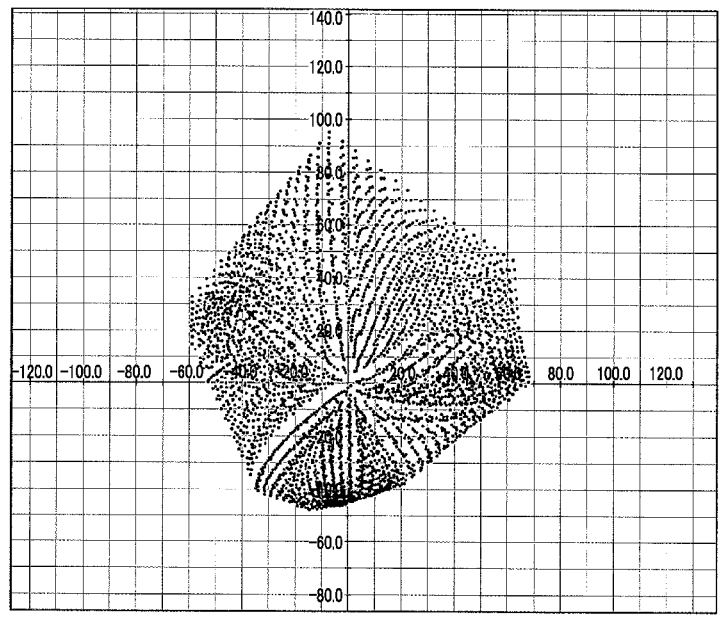
FIG. 18 is a diagram showing an example of a generated input and output characteristic model.

If the correspondence table 200 is completed by the colorimetry of the patch chart 1, the characteristic model generation unit 121 performs a process of generating an input and output characteristic model by using the equivalent patch data items 5. FIG. 18 is a diagram showing an example of a generated input and output characteristic model 210. This generation process is called a complementary operation in the present exemplary embodiment. In the complementary operation, the HSL values which respectively correspond to the RGB values constituting a multi-dimensional input correspondence table (color conversion table) built in the image forming device 100 are initially calculated.

If the HSL values corresponding to the RGB values constituting the multidimensional input correspondence table (color conversion table) are calculated, the HSL values are substituted for the approximate expressions (relational expressions) given by Expression 13, Expression 17, and Expression 19, and the calculated values are overwritten in the Lab values of the input and output characteristic model 210. Since the calculated values are overwritten and stored, the Lab values present in the correspondence table 200 shown in FIG. 17 are also overwritten. For example, in the case of FIG. 17, the Lab value corresponding to (0, 0, 32) of the RGB value is (18.25, 14.71, 5.92), and in the case of FIG. 18, the Lab value corresponding to (0, 0, 32) of the RGB value is (22.5, 12.32, 4.63).

FIG. 18 shows a result acquired by projecting 4913 (=$17^3$) color values constituting the input and output characteristic model 210 on the a-b surface in the Lab color space. A state in which 4913 color values are densely arranged with regularity on the a-b surface shown in FIG. 18 is shown. Such regularity is regularity that is not acquired in a case where the patch data items 7 are arranged at equal intervals in the RGB color space.

Generation Process of Input and Output Characteristic Model

Figure 19:
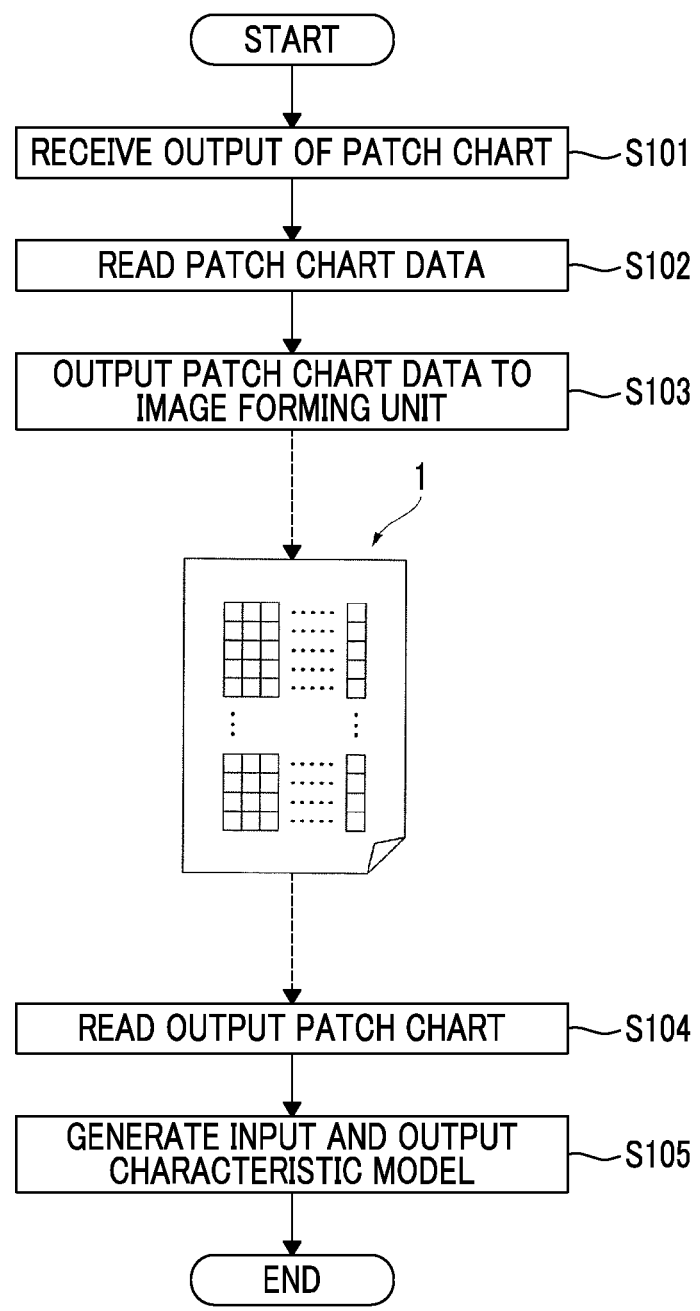
FIG. 19 is a flowchart for describing a procedure of processes performed by the image forming device.

Hereinafter, a procedure of processes performed by the image forming device 100 will be described. FIG. 19 is a flowchart for describing a procedure of processes performed by the image forming device 100. The CPU 111 of the controller 110 executes the program, and thus, the processes shown in FIG. 19 are realized.

Initially, the controller 110 receives an output of the patch chart 1 through the operation reception unit 116 (step 101). The controller 110 reads the patch chart data items received by the reception unit from the storage 114, and outputs the read patch chart data items to the image forming unit 118 (steps 102 and 103). The patch chart 1 on which the patches 3 corresponding to specific colors different from each other are arranged is printed on the paper by performing this process.

Thereafter, the user arranges the printed patch chart 1 in a predetermined position of the image reading unit 117, and instructs that colorimetry is to be started through the operation reception unit 116. If a colorimetry starting instruction is received, the controller 110 measures colors of the patches 3 constituting the patch chart 1 through the image reading unit 117 (step 104). The colorimetric results are supplied to the characteristic model generation unit 121 from the image reading unit 117.

Subsequently, the controller 110 instructs the characteristic model generation unit 121 to generate the input and output characteristic model 210 (step 105). As stated above, the characteristic model generation unit 121 that receives a generation instruction of the input and output characteristic model 210 initially completes the correspondence table 200 shown in FIG. 17, and then performs the complementary operation to generate the input and output characteristic model 210 shown in FIG. 18.

As described above, in the present exemplary embodiment, since the patch data items 7 that define the colors of the patches 3 constituting the patch chart 1 are selected so as to have regularity on the hue planes 21 in the color space defined by the hue (H), the lightness (L), and the saturation (S), even in a case where a smaller number of patch data items 7 are used, the complementary operation and the input and output characteristic model 210 are acquired with high accuracy unlike a case where the patch data items 7 are selected so as to have regularity in the RGB color space.

Another Exemplary Embodiment

Although the exemplary embodiment of the present invention has been described, a technical scope of the present invention is not limited to the scope described in the aforementioned embodiment. It is apparent from the description of claims that various changes or modifications of the aforementioned embodiment may be made without departing from the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image control device comprising:
a controller, configured to:
receive patch chart data items arranged such that patch data items corresponding to a plurality of patches belonging to a same hue, among a plurality of patches constituting a patch chart, are positioned only in any of grid points of grid lines which divide a lightness axis and a saturation axis which define a hue plane corresponding to the hue at equal intervals;
output the patch chart data items to a print engine which forms the patch chart on a recording material if an output operation of the patch chart is received;
acquire colorimetric values of the patches corresponding to the patch data items;
generate an input and output characteristic model which is a relationship between an input color signal and an output color by using color data items in a color space defined by hue, lightness, and saturation, which correspond to the patch data items and the colorimetric values which correspond to the patch data items;
receive and convert an input color image signal to an output color image signal by using the input and output characteristic model; and
output the output color image signal to print an image on a medium.

2. The image control device according to claim 1, wherein the controller generates the input and output characteristic model based on a relational expression between the color data items corresponding to the patch data items and the colorimetric values corresponding to the patch data items.

3. The image control device according to claim 1, wherein color data items are arranged such that the number of color data items corresponding to the patch data items belonging to the same hue plane in the color space defined by hue, lightness, and saturation becomes smaller as the saturation becomes greater.

4. The image control device according to claim 3, wherein the color data items are arranged such that the number of color data items linearly becomes smaller as the saturation becomes greater.

5. The image control device according to claim 1, wherein at least a plurality of color data items corresponding to the patch data items belonging to the same hue plane in the color space defined by hue, lightness, and saturation is arranged in an outside edge of the hue plane.

6. The image control device according to claim 5, wherein the color data items are arranged in the outside edge at equal intervals.

7. The image control device according to claim 1, wherein color data items corresponding to the patch data items belonging to the same hue plane in the color space defined by hue, lightness, and saturation are arranged only in any of vertices of geometric shapes that divide the hue plane.

8. The image control device according to claim 1, wherein an arrangement of color data items in a first hue plane in the color space defined by hue, lightness, and saturation is common to an arrangement of color data items in a second hue plane different from the first hue plane.

9. A non-transitory computer readable medium storing a program causing a computer to execute a process, the process comprising:
receiving an operation for instructing that a patch chart is to be formed on a recording material;
reading patch chart data items arranged such that patch data items corresponding to a plurality of patches belonging to a same hue, among a plurality of patches constituting the patch chart, are positioned only in any of grid points of grid lines which divide a lightness axis and a saturation axis which define a hue plane corresponding the hue at equal intervals, from a storage;
outputting the patch chart data items;
acquiring colorimetric values of the patches corresponding to the patch data items;
generating an input and output characteristic model by using color data items in a color space defined by hue, lightness, and saturation, which correspond to the patch data items and the colorimetric values which correspond to the patch data items;
receiving and converting an input color image signal to an output color image signal by using the input and output characteristic model; and
outputting the output color image signal to print an image on a medium.

* * * * *